Sept. 25, 1962 L. D. BALL ETAL 3,056,128
VELOCITY TRACKING SYSTEM FOR INCREASING THE
RANGE OF ACQUISITION OF MOVING TARGETS
Filed March 7, 1955 8 Sheets-Sheet 1

FIG. 1.

INVENTORS:
LLOYD D. BALL
BROOKS E. COWART
GEORGE B. CRANE
ORIN H. KNOWLTON, JR.
BY
ATTORNEY.

Sept. 25, 1962     L. D. BALL ETAL     3,056,128
VELOCITY TRACKING SYSTEM FOR INCREASING THE
RANGE OF ACQUISITION OF MOVING TARGETS
Filed March 7, 1955     8 Sheets-Sheet 2

INVENTORS:
LLOYD D. BALL
BROOKS E. COWART
GEORGE B. CRANE
ORIN H. KNOWLTON, JR.

BY

ATTORNEY.

INVENTORS:
LLOYD D. BALL
BROOKS E. COWART
GEORGE B. CRANE
ORIN H. KNOWLTON, JR.
BY
ATTORNEY.

Sept. 25, 1962  L. D. BALL ETAL  3,056,128
VELOCITY TRACKING SYSTEM FOR INCREASING THE
RANGE OF ACQUISITION OF MOVING TARGETS
Filed March 7, 1955  8 Sheets-Sheet 4
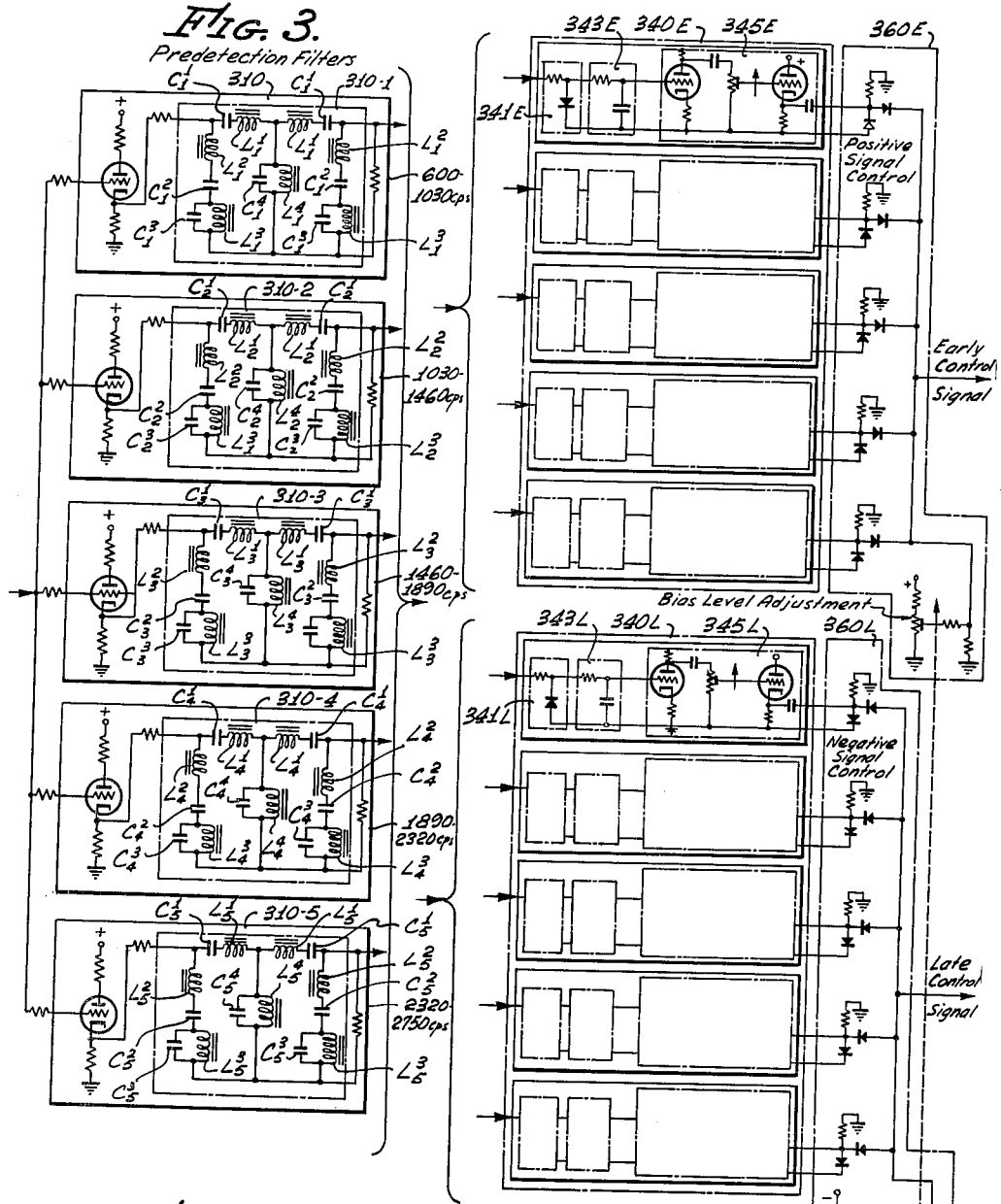
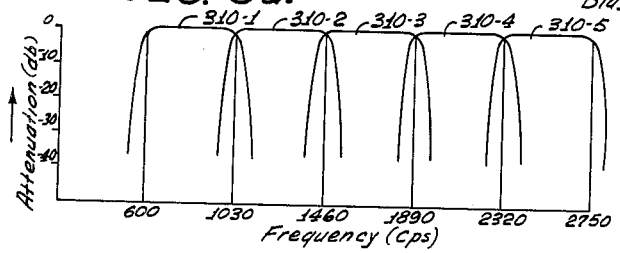
INVENTORS:
LLOYD D. BALL
BROOKS E. COWART
GEORGE B. CRANE
ORIN H. KNOWLTON, JR.
BY
ATTORNEY.

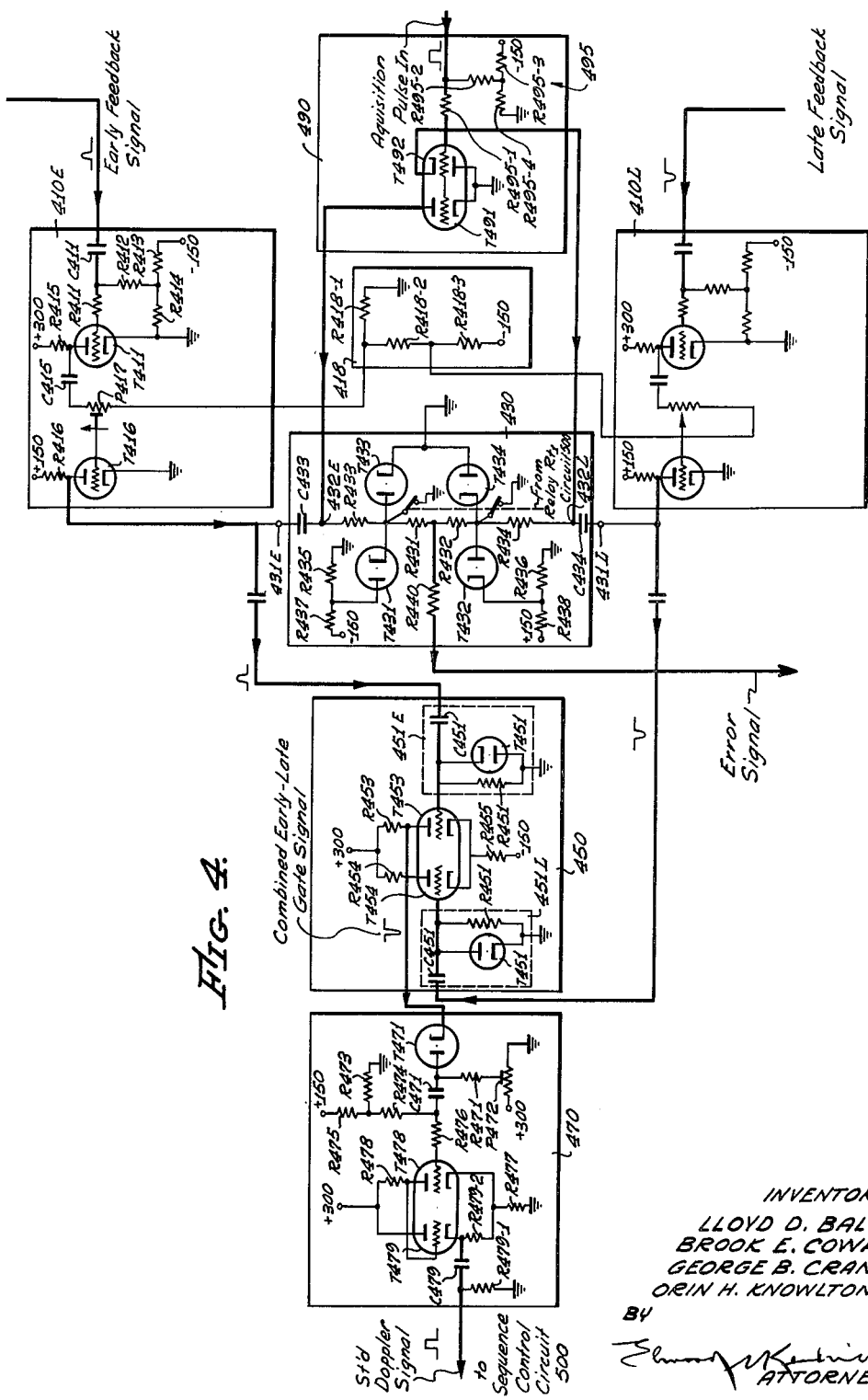

INVENTORS:
LLOYD D. BALL
BROOKS E. COWART
GEORGE B. CRANE
ORIN H. KNOWLTON, JR.

BY
ATTORNEY

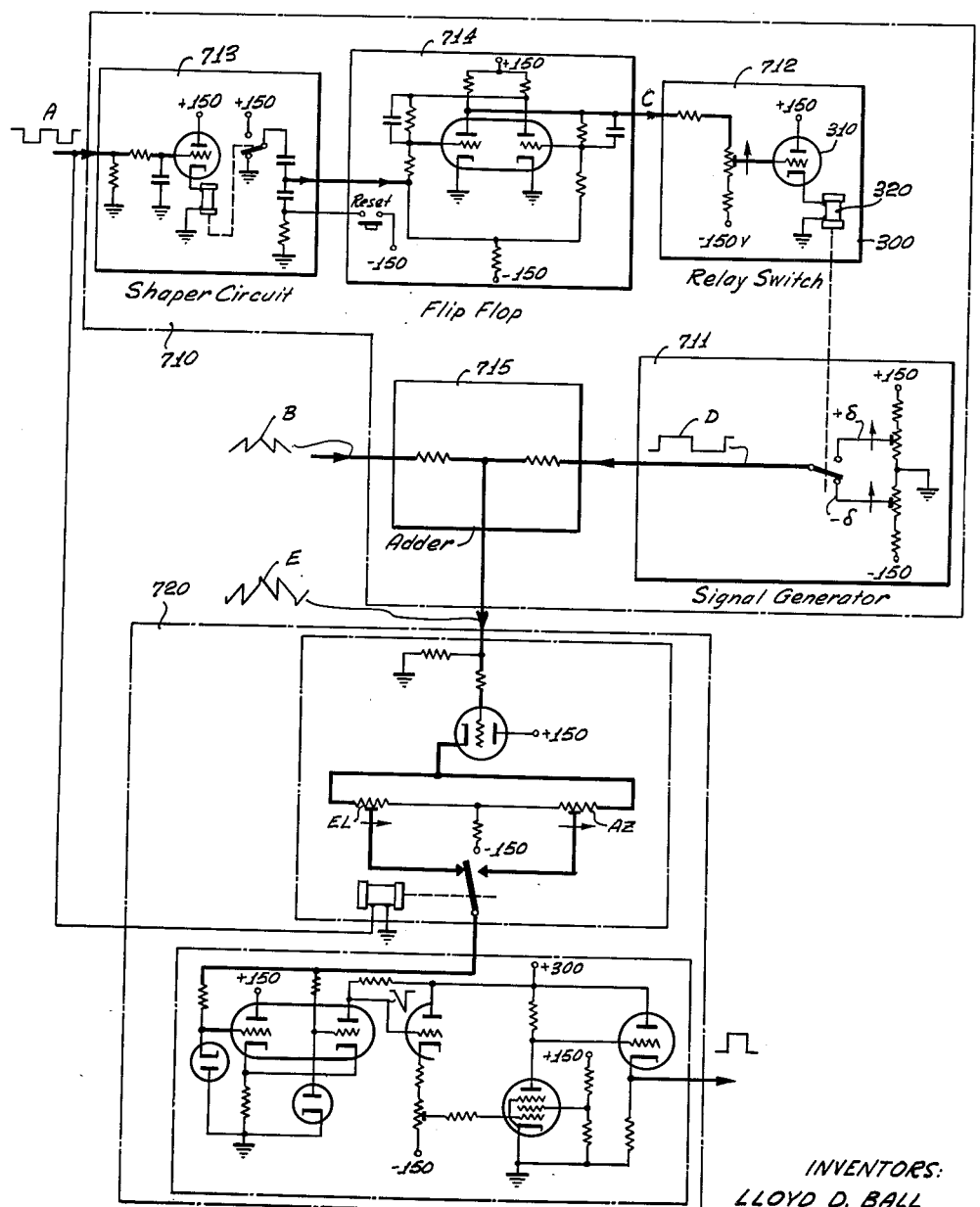

United States Patent Office 3,056,128
Patented Sept. 25, 1962

3,056,128
VELOCITY TRACKING SYSTEM FOR INCREASING THE RANGE OF ACQUISITION OF MOVING TARGETS
Lloyd David Ball, Los Angeles, Brooks Ehrmon Cowart, Pacoima, George Bruer Crane, Redondo Beach, and Orin Henry Knowlton, Jr., Los Angeles, Calif., assignors to Gilfillan Bros. Inc., Los Angeles, Calif., a corporation of California
Filed Mar. 7, 1955, Ser. No. 492,627
13 Claims. (Cl. 343—7.3)

This invention relates to a velocity tracking system for increasing the range of acquisition of moving targets and, more particularly, to a system of this type which may be utilized in a track-while-scan system for velocity tracking moving targets in accordance with received Doppler frequency signals, the system being highly discriminative against rain, noise, or other clutter, thereby allowing an increase in the range of acquisition.

In conventional radar tracking systems a predetermined volume in space is scanned for possible approaching targets, where the volume is bounded by elevation and azimuth angles as well as a predetermined maximum range. When a target is detected within this volume, range and angle tracking devices are brought into operation providing signal information indicating the location of the target. This signal information may, for example, be utilized in an automatic ground control system or other track-while-scan radar system where the detection of a moving target is continuously required.

Since the tracking system must provide information signals derived from a relatively large space volume as compared to the size of a typical target, the problem of rain, noise, and other clutter becomes quite serious beyond certain ranges. The noise problem is especially serious in track-while-scan systems where the target scanning period for a particular target is small considering the entire scanning interval. This means that a useful signal must be distinguished from noise during a very short scanning period.

One approach which has been made to this problem is a method of angle and range tracking where the volume of space which must be investigated is limited by surrounding a target with range and angle gating signals automatically controlled to follow the target by means of a servo loop circuit. This improvement is described and claimed in copending U.S. patent application Serial No. 265,977 for "Range and Angle Tracking of Aircraft Using Angle Gated Video," by Alvin G. Van Alstyne, filed January 11, 1952, now Patent Number 2,961,650. While this method provides a definite improvement in the art, the noise and clutter problem is still considerable beyond certain ranges.

The present invention provides a velocity tracking system which allows a considerable increase in the range of moving target acquisition and may be considered to constitute auxiliary equipment for any type of radar equipment which requires moving-target-indicating signals beyond ranges where the noise and clutter problem becomes acute.

The basic principle of the invention resides in the utilization of a maximum of target information in order to limit the area of scanning in the domains of space, time, and frequency. This area limitation results in an accentuation of useful signals over noise and other clutter which may be assumed to be statistically averaged over the entire area of possible investigation. In a sense the invention provides a system for amplifying moving-target-indicating signals and provides simulated range pulses which may be utilized in other systems.

The feature of velocity tracking provided by the invention introduces a varying range signal produced as the integral of the computed initial velocity of a target as it passes first and second previously established range marks. Any error in this initial target velocity computation or change of velocity after the second range mark is detected through an early-late gate arrangement where the varying range signal is converted into range pulses which are compared with actual target echoes, indicating the target range. Detected error or velocity change signals resulting from this comparison are then fed back to the range signal generating circuit and are integrated and combined with the initial velocity signal to form a varying velocity signal corresponding to the actual target velocity.

Another important contribution of the invention resides in noise limitation in the frequency domain. This improvement is achieved by separating the expected Doppler frequency region for the velocity range of targets expected into a plurality of band pass divisions. Any moving-target-indicating signal detected in a frequency division is then individually compared with a bias-level signal representing the expected statistical noise level throughout the frequency region. Whenever the comparison indicates a Doppler signal greater than the expected statistical noise level, an output signal results. In this manner statistically white noise considered to have an average or mean value throughout the entire region is effectively divided into a plurality of discrete frequency spectrums and compared to any target-indicating-signal which may occur in the corresponding spectrum. Consequently, the effect of noise in a single division is decreased as a factor of the number of divisions.

A more specific description of the theory and technique of the Doppler frequency discrimination over noise is found in copending U.S. application Serial No. 485,974 for "Highly Discriminative Filter and Bias-Level Gating Circuit," by Brooks Ehrmon Cowart and Lloyd David Ball, filed Feb. 3, 1955, now U.S. Patent 2,848,713, where the component aspects of the circuit are claimed. The present invention relates only to the utilization of this circuit in a velocity tracking system where useful Doppler signals are accentuated over noise and other clutter.

In its general structural form the invention comprises a signal generator actuable to produce first and second range signals and then to produce a varying range signal as the integral of an applied input signal representing target velocity. The range signals are utilized to control a group of circuits which are also responsive to bipolar video signals received as a result of a moving target reflection. These circuits are operable to produce early and late feedback signals indicating that the range specified by the range signal is respectively greater than and less than the actual target range. The feedback signals then are applied to an error signal generating circuit which produces an output signal indicating the sense and magnitude of the difference between the actual target range and the target range specified by the corresponding range signal.

The early and late signals are also combined to produce first and second acquisition signals in a sequencing circuit which is operative to actuate an initial velocity computer to produce a signal indicating the target velocity between first and second ranges. The error signals are integrated in an error integrator which also receives the initial velocity signal as a constant of integration and produces the variable velocity signal which is applied to the range signal generator.

In the preferred form of the invention, the circuits for producing the early and late feedback signals include a pair of first circuits for detecting and smoothing the Doppler frequency component in the bipolar video signals and a pair of second circuits coupled to the first circuits, respectively, each of said second circuits being a highly discriminative Doppler frequency filter and bias-level gating circuit.

In a particular form such as that described in the above-mentioned copending application to Cowart and Ball, the second circuits each include a set of predetection filters for separating the Doppler frequency range into a corresponding set of frequency divisions, a corresponding set of detectors and filters for separating the zero frequency component out of the signals produced by the set of predetection filters, and a corresponding set of bias-level gates having a common output circuit for producing a signal indicating the presence of a Doppler frequency signal having a level greater than a predetermined bias level established to eliminate noise. The bias-level gates producing the early and late feedback signals indicating changes or errors in initial velocity computation may be provided by directly summing these signals; the sum of signals of opposite polarity being effectively a difference.

Considered as a whole, then, the invention provides a servo or feedback system where a varying range signal is produced as the integral of a computed initial velocity signal. The range signal is thus stabilized through the feedback loop so that it accurately simulates the actual moving target range. Consequently, the range signal or range pulses produced in the comparison operation with actual target echoes may be utilized as simulated target information signals which can constitute input signals for another system such as that described in the above-mentioned copending application by Van Alstyne.

Accordingly, it is an object of the present invention to provide a system for velocity tracking of moving targets to provide an increased range of acquisition.

Another object is to provide a system for target location wherein the volume of space which must be investigated to locate targets is limited by introducing a variable range parameter formulated on the basis of integrated target velocity.

A further object of the invention is to provide a target tracking system wherein the range of investigation is limited by producing a variable range signal as the integral of a varying velocity signal formulated by combining an initial velocity signal with error or velocity change signals occurring thereafter.

Still another object is to provide a system wherein the volume of investigation is further limited in the Doppler frequency domain by separating the Doppler frequency spectrum into a plurality of divisions and detecting the occurrence of a signal in any of these divisions through a bias-level gating circuit.

Yet another object of the invention is to provide a feedback system for target tracking wherein the same set of circuits may be utilized to produce target acquisition signals, to provide an initial target velocity signal, and to integrate the target velocity signals to provide a variable range signal.

Still a further object of the invention is to provide an improved system for tracking moving targets in accordance with received Doppler signals in a manner providing a high discrimination against rain, noise, or other clutter thereby allowing an increase in the range of acquisition.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

FIG. 1 is a block diagram of the basic embodiment of a velocity tracking system for increasing the range of moving target acquisition, according to the present invention;

FIG. 3 is a schematic diagram of a suitable form for the highly discriminative Doppler frequency filter and bias level gating circuits of the embodiment of FIG. 1;

FIG. 3a is a graph of the attenuation characteristic for the filter circuits shown in FIG. 3;

FIG. 4 is a schematic diagram of suitable form for the combining circuit and standard Doppler signal generator of FIG. 1;

FIG. 7 is a schematic diagram of a suitable form of the angle gate generator utilized in the embodiment of FIG. 1.

*General Description of Invention*

(AS SHOWN IN FIG. 1)

Figure 1A:
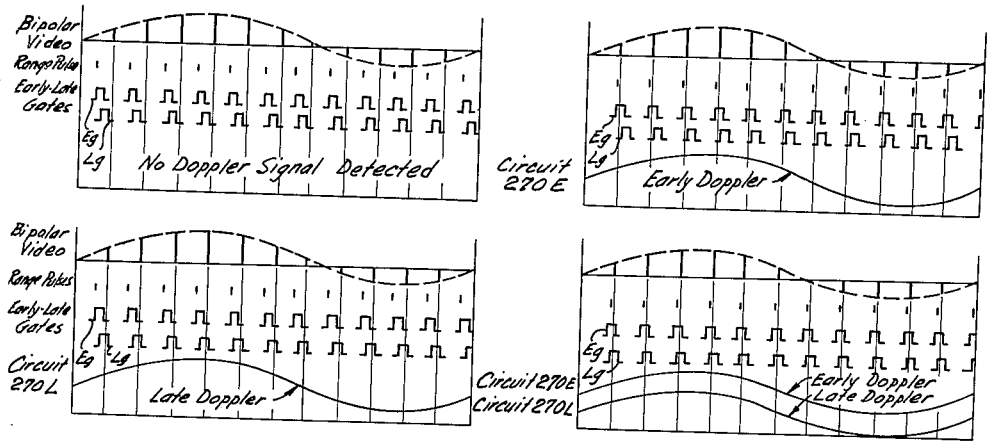
FIGS. 1a and 1b are composite diagrams of the waveforms of signals appearing at various points in the embodiment of FIG. 1 illustrating the operation of the system prior to, during, and after target acquisition.

Reference is now made to FIG. 1 wherein there is shown the basic embodiment of the present invention. It will be noted that in addition to showing basic components which are utilized in the system of the invention, FIG. 1 also shows a block diagram arrangement of a system including a radar transmitter 10 and a receiver 20 in order to provide a general background setting. It is helpful to consider the general form of the radar system before describing the present invention since certain input signals are provided therein.

It will be noted that signals transmitted by radar transmitter 10 through an antenna 12 are reflected from a target 14 and received through an antenna 15 and a mixer stage 16 by receiver 20. The received target echoes are applied to a phase detector circuit 30 which also receives signals through a mixer 40 from a local oscillator 50. Phase detector 30 provides bipolar video signals which are modulated with the Doppler frequency component of the moving target. Essentially, the operation of the radar components as shown is to compare the phase relationship of the target echo signals with a reference frequency produced by oscillator 50 to produce a series of phase detected signals having an amplitude corresponding to the phase difference between the transmitted signal and the received target echo signal, or specifically the difference between the signal from mixer 40 and receiver 20.

The general principles of Doppler frequency detection and the utilization thereof in tracking moving targets are now well-known in the art and will not be considered in further detail in the present specification. Reference is made to pages 286 through 290 of a book entitled "Radar Engineering," by Donald G. Fink, published in 1947 by McGraw-Hill Book Company, Inc., New York and London, for a more detailed explanation of these principles.

The important thing to note for the purpose of the present invention is that input signals are available from the radar transmitting and receiving system providing Doppler frequency modulated, phase detected target echoes and also system trigger signals indicating when target scanning signals are transmitted. These signals are indicated in FIG. 1 on the corresponding leads.

As indicated in FIG. 1, the system trigger signals indicating the transmission of radar scanning signals are applied to a time-modulator circuit 200 which also receives a range signal and is operative to delay the trigger signals to produce range pulses, where the time interval between each range pulse and the corresponding system trigger signal is varied according to the amplitude of the applied range signal. The range pulses are applied to an early-late gate signal generator 240 producing early and late gating signals E*g* and L*g*. The early and late gating signals effectively provide an error range interval and are utilized to indicate the early, late or in-phase relationship between the actual targe echoes and the range pulses.

The early and late gating signals are applied to early and late Doppler frequency detector and smoother circuits 270E and 270L, respectively, which also receive the phase detected target echoes, sometimes referred to as bipolar video signals. The function of circuits 270 is to detect the occurrence of phase detected target signals during respective early and late gate signal portions. Thus circuit 270E detects the occurrence of any phase detected signals during the application of early gate signals and circuit 270L detects the occurrence of any phase detected signals during the application of late gate signals. The output signals produced by circuits 270 then are Doppler frequency signals having amplitudes dependent upon the phase relationship between the range pulses generated by time modulator 200 and the received target echoes. Moreover, the early and late gate signals provided by circuit 200 have a predetermined time duration which is substantially smaller than the period between transmission of target scanning signals and subsequent echoes, so that circuits 270 provide no useful Doppler frequency output signal until the actual target range comes within a predetermined range interval of the range specified by the range signal applied to circuit 200. The predetermined range interval is determined by the time duration of the early and late gate signals. The operation of circuits 240 and circuits 270 will be better understood after considering the waveforms shown in FIG. 1*a*.

The detected Doppler frequency signals produced by circuits 270E and circuits 270L are applied respectively to highly discriminative Doppler frequency filter and bias level gating circuits 300E and 300L. The operation of circuits 300 is to discriminate the Doppler frequency signals, which may occur in scanning a target, from noise or other clutter. Circuits 300 then produce signals having levels indicating the early or late presence of a Doppler signal with respect to the occurrence of a range pulse generated by time modulator 200.

In the preferred form, circuits 300 each include a set of predetection filters 310, a corresponding set of detectors and zero frequency filters 340, and a set of bias level gates 360. Circuits 310 provide a plurality of filter sections for separating the Doppler frequency signals expected into a plurality of frequency divisions so that a target may be detected in any of the frequency divisions, resulting in a signal passing through a corresponding filter section. It is possible, of course, that two filter sections may pass Doppler signals overlapping two corresponding frequency divisions. Any signals produced by circuits 310 then are detected and the low frequency and direct-current component is filtered out in circuits 340. Finally, the detection of any signal in one of circuits 340 is utilized to actuate one of bias-level gates 360 which produces an output signal when the input signal is above a predetermined level assumed to represent noise. This frequency separation and bias-level gating technique results in a greatly accentuated signal-to-noise ratio.

In one particular form bias-level gates 360E and 360L produce positive and negative output signals, respectively, upon detection of a Doppler signal. These signals are applied to a combining circuit and standard Doppler signal generator 400. Circuit 400 produces an error signal as the difference of the applied signals, or the sum if they are of opposite polarity. The error signal represents the difference in range between the range represented by the signal applied to time-modulator 200 and the actual target range. This results because signals produced by circuits 300E and 300L occur only when Doppler signals are detected early and late, respectively, with relation to the range represented by the signal applied to circuit 200. Thus the error signal indicates the sense and magnitude of the range difference between the actual target range and the predicted target range represented by the range signal.

Circuit 400 also combines the signals produced by circuits 300 additively to produce a standard Doppler signal indicating that a target is passing through a predetermined range interval surrounding the range specified by the signal applied to time modulator 200.

The standard Doppler signal, as well as certain other signals which will be introduced in the detailed description which follows, is applied to a sequencing control circuit 500 which produces target acquisition signals and sequencing signals. These signals are utilized to actuate a range signal generator circuit 600 to produce the range signal controlling time modulator 200 as a function of the integral of target velocity.

Circuit 600, it will be noted, includes an initial velocity computer 610 responsive to first and second acquisition signals produced by sequencing circuit 500 indicating the passage of a target between corresponding first and second ranges for producing an initial velocity signal as a function of the average target velocity between the ranges specified. The initial velocity signal as well as the error signal produced by circuit 400 are applied to an error signal integrator 640 which produces the varying velocity signal. Essentially, the error signal integrator is a target acceleration integrator in the sense that it provides a variable velocity signal as a function of an initial velocity plus the integral of velocity changes or errors which may be considered to be acceleration.

The variable velocity signal then is integrated in a velocity integrator 650 which also receives initial range setting signals through a range setting circuit 660 controlled by signals produced in sequencing circuit 500.

Sequencing circuit 500 is also controlled by angle gate signals produced by an angle gate generator 700. Angle gate generator 700 may form part of the system described in the above-mentioned copending application by Van Alstyne, Serial No. 265,977. The angle gate signals produced by circuit 700 effectively limit the elevation and azimuth angles which are investigated in the manner described in the copending application. Sequencing circuit 500 then does not produce an acquisition signal unless the target is within the elevation or azimuth angle specified by the gate generator 700 as well as within the range interval specified by the standard Doppler signal used by circuit 400. In addition, certain other conditions control the operation of circuit 500 represented by the wave-off signal, reject signal, data-good signal, and sequence-start signals applied to circuit 500. The purpose of these signals will be more fully understood when circuit 500 is considered in specific detail with reference to FIG. 5.

The system of FIG. 1 may be considered to be a feedback system where the early and late signals produced are feedback signals indicating the difference between the range specified by the range signal and the actual range indicated by the bipolar video, target echoes. Thus circuits 200, 240, 270 and 300 may be considered to form a single means which is responsive to range signals and to bipolar video signals for producing early and late feedback signals indicating the relationship between the actual target range and the computed target range. It will be understood, however, that other arrangements are possible for providing the feedback function indicating the error in range computation and that the particular combination shown is not intended as a limitation in the invention.

*Operation of Invention*

Figure 1B:
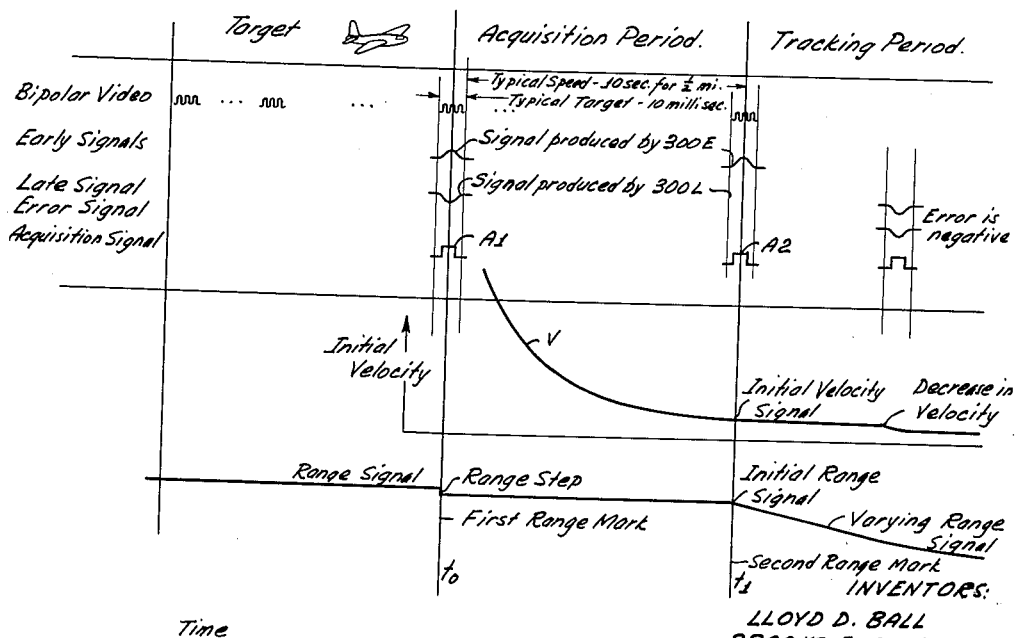

(REFERRING TO FIGS. 1*a* AND 1*b*)

The operation of the system of FIG. 1 is best understood by referring to the waveforms shown in FIGS.

1a and 1b. FIG. 1a shows the general time relationship between the phase detected target echo signals which are received, the range pulses produced by time modulator 200 and the early-late gate signals produced by generator 240. The time duration of the early and late gate signals has been greatly exaggerated to show the general relationship between these signals and the bipolar video signals.

As indicated in FIG. 1a, each range pulse actuates circuit 240 to produce a pair of overlapping gating signals specified as Eg and Lg, respectively indicating early and late gating signals. The actual time of duration of the overlapping gating signals is quite small compared to the pulse repetition rate of the target echoes. In a particular application, for example, the period between target echoes may be in the order of 182 microseconds; the period from the beginning of the early gating signal to the end of the late gating signal may be in the order of .5 microsecond; and the target echo or bipolar video signal duration may be in the order of .2 microsecond. Thus it will be noted that no Doppler signal would be produced by either of circuits 270 unless a target echo occurs during one of the gating signals, the gating signal duration corresponding to a predetermined range error interval. In the specifically illustrated situation this means that the target echoes and range pulses must occur within .5 microsecond of each other.

It will be noted that FIG. 1a shows that an early Doppler signal is produced by circuit 270E when the target echoes occur within the early gate signal portion Eg indicating that actual range is less than computed range; that a late Doppler signal is produced by circuit 270L when the target echoes occur during a late gate signal portion indicating that actual range is greater than computed range; that substantially equal amplitude Doppler signals are produced by circuits 270 when the target echoes occur during the overlapping portion of the gating signals indicating an equality between actual and computed range; and that no Doppler signals are produced when the target echoes are not within the range interval specified by the time duration of the gating signals. Effectively the overlapping portion between gating signals is the true range pulse since the occurrence of target echoes during this interval indicates that the computed range is correct.

The general operation of the system in target acquisition and tracking is illustrated in FIG. 1b. As shown in FIG. 1b target bipolar video signals are received prior to the acquisition period but no early or late signals are generated. When the target crosses a first range mark, however, either an early, late, or combination early-late signal is produced which is utilized to form a first acquisition signal A1. An error signal E1 may also be formed at this time but has no effect upon the system as will be explained. The first acquisition signal actuates velocity computer 610 to produce an initial velocity signal $v$ which varies as the ratio of range-difference over time, and also actuates initial range-setting circuit 660 to step from a first range signal corresponding to the first range mark to a second range signal corresponding to a second range mark.

The velocity computer continues to generate the varying initial velocity function $v$ until the target crosses the second range mark specified by the second range signal. This results in a second acquisition signal A2 which terminates the operation of the velocity computer, resulting in an initial velocity signal which represents the average velocity of the target between the first and second range marks, or the range difference divided by the time of passage.

The second acquisition signal A2 also initiates the operation of velocity integrator 650 which begins forming the integral of the target velocity from an initial range condition equal to the second range signal. This begins the tracking period where subsequent acquisition signals have no effect upon the operation of circuit 600 except to allow the production of error signals indicating the difference between the early and later Doppler frequency signals produced by circuits 300E and 300L. The error signals then are integrated by the error signal integrator and added to the initial velocity signal to form a varying velocity signal which closely follows the actual target velocity. This variable velocity signal then is continuously integrated to provide the varying range signal which controls time modulator circuit 200. It will be noted that the target velocity vector is assumed to be in the direction of decreasing range so that the range signal is actually the difference between the initial range setting, or second range mark, and the integral of the varying velocity signal.

It may be seen in considering the operation of the system of FIG. 1, as depicted in FIGS. 1a and 1b, that the same circuits initially perform a target acquisition function and then operate in a feedback loop to provide a target tracking signal as the integral of an initial target velocity signal plus velocity errors or changes resulting during the tracking process. Thus range signal generator circuit 600 first is operable in response to sequencing signals produced by control circuit 500 to establish a constant range-indicating signal corresponding to the first range mark occurring at the beginning of the target acquisition period indicated in FIG. 1b. After a standard Doppler signal is produced by circuit 400, circuit 500 produces an acquisition signal A1 indicating the passage of the target through range mark #1, circuit 600 is then actuated to step the range signal to a second level representing range mark #2 and at the same time initial velocity computer 610 begins its operation.

Up to this point it may be stated that the system functions in an open-loop fashion since error signals have not as yet been utilized in any manner. However, as soon as the target passes range mark #2 and the corresponding acquisition signal A2 is produced, circuit 600 then begins to operate as part of a feedback loop where error signals are fed back to error signal integrator 640, modifying the initial velocity signal to provide a variable velocity signal tracking the target. In this manner then the same set of circuits in range signal generator 600 first operates to provide constant or initial condition signals and then is actuable to a continuous control loop during the tracking period.

While many suitable form of circuits can be utilized in practicing the invention, specific circuits are shown in order to illustrate an operable embodiment. It will be understood, of course, that many of the circuits shown are standard in the electronic art and may be replaced by any of a considerable group of equivalents. Moreover, as previously pointed out, many other combinations of circuits are possible for providing the basic functions required in the practice of the invention.

*Time Modulator Circuit, Early-Late Gate Signal Generator and Doppler Frequency Detector and Smoother Circuits*

Figure 2:
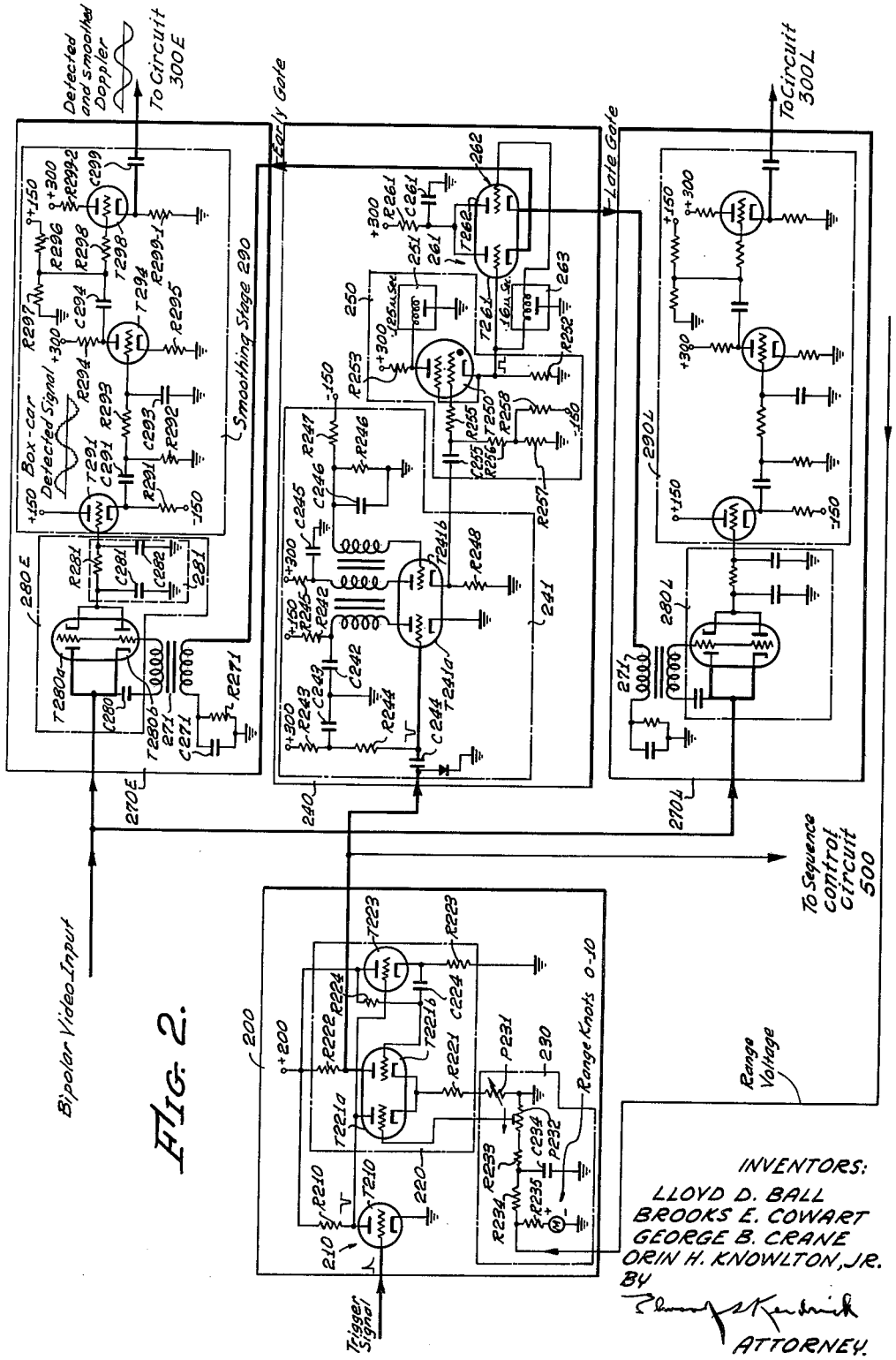
FIG. 2 is a schematic diagram illustrating suitable circuits for the time-modulator, the Doppler frequency detector and smoother circuits, and the early-late gate signals generator, all of FIG. 1.

Reference is made now to FIG. 2 where suitable forms of circuits for time-modulator 200, early-late signal generator 240, and Doppler frequency detector and smoother circuits 270 are shown. As indicated in FIG. 2, time modulator 200 receives system trigger signals which are applied to an amplifier stage 210 therein providing corresponding inverted and amplified output signals. The signals produced by stage 210 are applied to a single-state or one-cycle multivibrator stage 220 which is actuated to change states in response to the amplified trigger signal. Multivibrator 220 returns to its previous state after a time interval determined by the range signal voltage applied to an input circuit 230.

In operation time-modulator circuit 200 provides an output signal having a time-width corresponding to the amplitude of the range voltage applied to input circuit 230. This output signal is differentiated in being applied to circuit 240 to provide positive and negative-going signals, where the negative-going signal corresponds to the range pulse discussed above since it is delayed with respect to an applied system trigger signal by a time interval representing the applied range voltage signal. The specific circuit connections in stages 210, 220 and 230 will not be described since the time-modulator circuit is a well-known circuit in the electronic art; other forms of circuits, for example, being described on pages 97 through 110 of a book entitled "Principles of Radar," by Reintjes and Coate, published in 1952 by McGraw-Hill Book Company, Inc. Suitable circuit values for a specific circuit arrangement of time modulator circuit 200 as well as all other circuits specifically described in this specification are listed at the end of the specification under the section entitled "Specific Circuit Elements." It will be noted that the potentials specified for these specific circuit elements are shown in the corresponding figures.

The differentiated, negative-going range pulse signal produced by time-modulator circuit 200 is applied to early-late gate signal generator 240 and more specifically to the input circuit of a blocking oscillator 241 providing a very sharp output signal in response to the applied range pulse. The output circuit of blocking oscillator 241 is cathode coupled to a thyratron circuit 250 which is fired by the blocking oscillator pulse and remains fired for a duration depending upon the time constant of a pulse delay line 251, receiving the output signal of the thyratron. Delay circuit 251 reflects the applied pulse after a predetermined time interval providing a negative signal which extinguishes the thyratron. The time the thyratron remains fired corresponds to the duration of each of the early and late gating signals which, for the purpose of illustration, are assumed to be of .25 microsecond duration. Thus delay line 251 is .125 microsecond long providing a reflected signal extinguishing thyratron 250 after .25 microsecond.

The .25 microsecond output signal produced by thyratron 250 is applied to a first amplifier stage 261 which has its cathode output circuit coupled to the primary winding of an input transformer in circuit 270E to be described. The output signal of thyratron 250 is also coupled through a delay circuit 263 to a second amplifier stage 262 which has its cathode output circuit coupled to primary winding of an input transformer in circuit 270L. The delay of circuit 263 is indicated to be .16 microsecond providing late gating signals which overlap the early gating signal in time by .09 microsecond. The purpose of this delay should now be understood from the previous discussion.

The early and late gating signals are applied respectively to circuits 270E and 270L. For simplicity only circuit 270E will be described, since it may be assumed for the purpose of illustrating one embodiment that circuits 270E and 270L are identical. Referring now to circuit 270E, it is noted that the early gate signals are applied to the primary of a transformer 271 having its secondary coupled to the grid input circuit of a box-car detector 280. Box-car detector circuit 280 also receives bipolar video input signals which are passed to an integrating circuit 281 therein whenever an early gating signal is received through transformer 271 simultaneously therewith. Thus the output signal provided by circuit 280 resembles the amplitude-modulating Doppler frequency component except that the signal values remain constant between received target echoes. A typical waveform is illustrated on the output lead of circuit 280.

The box-car detected bipolar video signal is then passed through a smoothing stage 290 which is operative to eliminate most of the frequency components corresponding to the target echo repetition rate. This provides a smoother Doppler frequency component as illustrated at the output lead of stage 290.

At this point it may be noted that no effective discrimination has been made to eliminate noise resulting from rain or other clutter from signals which are passed through circuits 280 and 290. The operation thus far is simply a separation of Doppler frequency components into early and late divisions where each division may carry a certain amount of noise.

*Highly Discriminative Doppler Frequency Filter and Bias-Level Gating Circuit*

(AS SHOWN IN FIG. 3)

The early and late Doppler signals produced by circuits 270E and 270L are then applied to circuits 300E and 300L, respectively. These circuits are shown in FIG. 3 where predetection filters 310 are shown as a single set of circuits since filter set 310E and set 310L may be identical. Circuits 340E and 340L for detection and zero frequency filtering, however, are shown separately since these circuits are designed to produce output signals of opposite polarity and, in a similar manner, circuits 360E and 360L are shown separately since these circuits provide bias level gates for producing positive and negative signals, respectively.

As shown in FIG. 3, the predetection filters may be of the well-known $m$-derived type; the design formulas for such filters being provided on pages 131 through 152 of a book entitled "Reference Data for Radio Engineers," by Federal Telephone & Radio Corporation, published by Knickerbocker Printing Corporation, New York. The specific type of $m$-derived filter employed in circuit 310 is shown on page 144 and referred to as a six element series band-pass filter. The design formulas for this circuit are found on page 145. The specific circuit parameters for predetection filters 310 have been selected to provide five band-pass divisions as follows: 600–1030 c.p.s.; 1030–1460 c.p.s.; 1460–1890 c.p.s.; 1890–2320 c.p.s.; 2320–2750 c.p.s. This division covers the expected Doppler frequency range of 600–2750 c.p.s. The attenuation characteristics of these filter divisions are shown in FIG. 3a where it will be noted that the attenuation function is inverted with respect to that shown on page 144 of the book entitled "Reference Data for Radio Engineers." It will also be noted that the actual band-pass characteristic does not have a sharp cut-off at the specified frequency divisions due to the fact that the inductors have finite resistance.

The specific circuit elements which may be utilized to provide the desired band-pass divisions as specified in FIGS. 3 and 3a are given in the above-mentioned copending application by Cowart and Ball; a similar set of reference symbols is utilized herein.

The important function to note with respect to circuits 310 is that the expected Doppler frequency range is divided into a plurality of band-pass divisions so that a target will be detected at most in two band-pass divisions and, as a general rule, will fall entirely within a single division. Thus the number of band-pass divisions which are utilized may be varied with the logical limit being determined by the band width of the expected Doppler frequency spectrum for a target having a fixed velocity. Thus it will be understood that the specific type of filter, whether $m$-derived or not, is of no particular importance since many variations are suitable. Moreover, as is more fully explained in the above-mentioned copending application by Cowart and Ball, it will be understood that five predetection filter sections are shown simply by way of example since the number of band-pass divisions may be varied with the logical limit being in the order of 17 divisions in the range 600–2750, where each division has a frequency range of approximately 125 c.p.s.

The signals produced by circuits 310E and 310L are applied to circuits 340E and 340L respectively, where each of circuits 340 includes a set of detectors and frequency filters corresponding to the set of predetection filters in the associated circuit 310.

Thus circuit 340E is shown as including a plurality of sets of circuit components, as will be described, one set for each of the filter sections in predetection filter 310E. Only one set of circuit components for each of circuits 340E and 340L is shown since these may be assumed to represent the others indicated in block diagram form.

Referring more specifically to circuit 340E, it is noted that each set of circuit components includes a rectifier circuit 341E for detecting the positive portions of any Doppler signal received from the associated division of predetection filter 310E; a RC filter 343E which essentially is a low pass filter for deriving the low frequency or D.C. component from the detected signal provided by circuit 341E; and an amplifier stage 345E for producing a corresponding amplified output signal. Each of this set of circuits then provides a positive signal having a level corresponding to the amplitude of the early Doppler signal passing through the associated division of predetection filter 310E.

In a similar manner, circuit 340L includes a rectifier circuit 341L providing detected signals corresponding to the negative portions of Doppler signals received from associated divisions of predetection filter 310L. The RC filter circuit 343L and amplifier 345L may be similar to the equivalent circuits in circuit 340E.

It will be understood that each of circuits 340 includes the same number of sets of circuit components as is included in the associated set of predetection filters. Thus if predetection filters 310 each include five band-pass divisions, then each of circuits 340 includes five sets of circuits for rectification, filtering, and amplification.

The detected and low frequency filtered signals provided by circuits 340 are then applied to respective bias level gates 360E and 360L. In the specific circuits which are illustrated it has been assumed that circuits 340E and 340L provide positive and negative signals, respectively, representing detected early and late Doppler signals. Thus bias level gate 360E is arranged to provide a positive bias level eliminating positive noise components below this level; and, in a similar manner, bias level gate 360L is arranged to provide a bias-level for negative signals in order to eliminate negative noise components having amplitudes less than the predetermined noise level. Therefore, it will be noted that the biasing diodes in circuit 360E are arranged to pass positive signals and are biased by a positive potential applied to the cathodes of the diodes and that the diodes in circuit 360L are arranged to pass negative signals and are biased by a negative potential applied to the anodes of the diodes.

A more complete description of the highly discriminative Doppler frequency filter and bias level detector circuits 300 may be found in the above-mentioned copending application by Cowart and Ball where the specific circuit connections shown in FIG. 3 are described in detail and the circuit operation and theory are explained. This detailed description is omitted from the present specification in order to limit the discussion to the features of the system rather than features residing in particular components.

The important thing to note in examining FIG. 3 is that circuits 300 provide early and late signals, which may have opposite polarity, indicating the presence of a moving target as well as the time relationship between target echo signals and the computed range pulses.

The early and late signals produced by circuit 300 will be referred to as feedback signals since they are utilized, in a manner to be described, to provide an error signal for velocity computing and complete a loop for automatic tracking. However, these signals may also be referred to hereafter as early and late control signals since, as pointed out previously, the same signals are also utilized for other control during the acquisition phase of operation when the system effectively is in an open-loop status.

*Combining Circuit and Standard Doppler Signal Generator*

(AS SHOWN IN FIG. 4)

The early and late feedback or control signals then are applied to combining circuit and standard Doppler signal generator 400, one form of which is illustrated in FIG. 4. Referring now to FIG. 4, it is noted that the early and late feedback signals are applied to early and late amplifier stages 410E and 410L, respectively; stages 410 having a common grid-bias circuit 418.

The output signals produced by circuits 410E and 410L are applied respectively to input terminals 431E and 431L of an error signal generating network 430 and to first and second input circuits 451E and 451L of a differential amplifier stage 450 which provides a combined early and late feedback signal.

The combined early and late control signal is applied to a Schmitt trigger circuit 470 which provides a standard Doppler signal corresponding to the combined early and late control signals and is utilized, in a manner to be described, to control sequencing circuit 500 which produces corresponding acquisition signals.

Circuit 400 also includes an error-signal-network control stage 490 which receives acquisition pulses produced by circuit 500 and produces control signals which are applied to input terminals of the error signal generating network. The function of control circuit 490 is to limit the error signal generating interval to actual target scanning intervals as indicated by acquisition signals produced by circuit 500 following the second acquisition signal A2.

Error signal generating network 430 may be observed to include adding resistors R431 and R432 receiving input signals through series connected input resistors and capacitors R433, C433, and R434, C434, respectively. The junction of resistors R431 and R432 is connected to an output resistor R440. It will be noted that the input ends of resistors R431 and R432 are connected through separate relay contacts to ground. These relay contacts form part of relay R$t_1$ in circuit 500 which is introduced below. The purpose of this arrangement is to suppress any error signal prior to the receipt of a second acquisition signal A2 actuating relay R$t_1$. The second acquisition signal A2 indicates that tracking is to begin and error signals then are utilized in error integrator 640. It will also be noted that the input ends of resistors R431 and R432 are coupled to clamping diodes T433 and T434, respectively. These diodes are biased in a manner to prevent the passing of positive and negative signals, respectively, to adding resistors R431 and R432.

Even after the receipt of acquisition signal A2 circuit 430 is prevented from providing error signals due to the operation of vacuum tubes T491 and T492 in circuit 490, tubes T491 and T492 being coupled to control terminals 432E and 432L, respectively. Tubes T491 and T492 normally receive a negative grid bias signal from a biasing circuit 495 and provide high-impedance paths to ground for input capacitors C433 and C434, respectively. As a result, input capacitors C433 and C434 function as coupling capacitors prior to the receipt of positive acquisition signals applied to tubes T491 and T492. This means that positive and negative signals received by capacitors C433 and C434, respectively, are applied to corresponding input resistors R433 and R434 without any change in polarity and consequently are bypassed through corresponding diodes T433 and T434 to ground, and no error signal results.

However, during the interval that an acquisition signal is received by circuit 490, the grid bias on tubes T491 and T492 is made more positive, and capacitors C433 and C434 then each have low impedance paths to ground through a corresponding tube. When signals are received during this interval, then these capacitors are charged to the peak value of the signal received. After being thus charged, capacitors C433 and C434 discharge through associated resistors R433 and R434, the respective discharge paths being completed through diodes T431 and T432, and series connected resistors R435 and R436, respectively.

This arrangement not only prevents generating any error signal prior to a receipt of an acquisition signal by circuit 490 but also provides a standard error signal which has a peak value corresponding to the peak value of the input signal, and a time duration which is fixed according to the resistance-capacitance constant of the corresponding circuit.

In this manner the error signal generated does not vary as a function of the duration of the early and late Doppler signals produced by filter circuits 300. Consequently, the error signal integral is accurately regulated to represent the difference between early or late Doppler signals received and consequently represents the magnitude and sense of the phase relationship between the range pulse signals and received target echoes.

Combining circuit 450 is illustrated in a specific form which functions as follows. Since the late control signals are of opposite polarity from the early control signals, an inversion of early or late signals must be performed to allow the formation of a combined early-late signal. As an illustration it has been assumed for the purpose of the specific schematic diagram in circuit 450 that the early signals will be inverted, the resulting combined signal then being negative.

This operation is achieved in circuit 450 as follows. Positive or early control signals are applied to an input circuit 451E which passes these signals to the grid of a vacuum tube T453. Tube T453 then provides an amplified and inverted output signal. Negative input signals representing late control signals are applied to an input circuit 451L which passes these signals to the grid of a tube T454 having its cathode coupled to a common cathode load resistor R455 which is also coupled to the cathode of tube T453. Tube T454, then, in responding to an applied negative input signal effects a decrease in current contribution through load resistor R455 which allows an increase in current through tube T453 and results in a negative output signal. Thus in this manner the application of either an early or a late control signal results in a corresponding negative output signal derived from tube T453.

The combined early-late signal produced by circuit 450 is applied to a Schmitt trigger stage 470 providing a square-wave signal having a duration corresponding to the duration of the combined early-late gating signal. Since Schmitt trigger circuit 470 is a conventional circuit which is well known in the electronic art, a further discussion of its operation is not deemed to be necessary.

From this description it is apparent that circuit 400, considered as a whole, produces error signals during the tracking period after the receipt of acquisition signal A2, during the time subsequent acquisition signals are produced indicating that the desired target is being scanned. It has been pointed out that these error signals are accurately regulated so that the integral thereof may be considered to represent corresponding errors in target range variation or in another sense, velocity changes.

The combining circuit described may be considered to be an inverting adder where one of the input signals is inverted and then added to the other input signal. Thus, in an alternate form, a separate inverter stage may be utilized in combination with a resistance adder.

*Sequencing Control Circuit*

(AS SHOWN IN FIG. 5)

Figure 5:
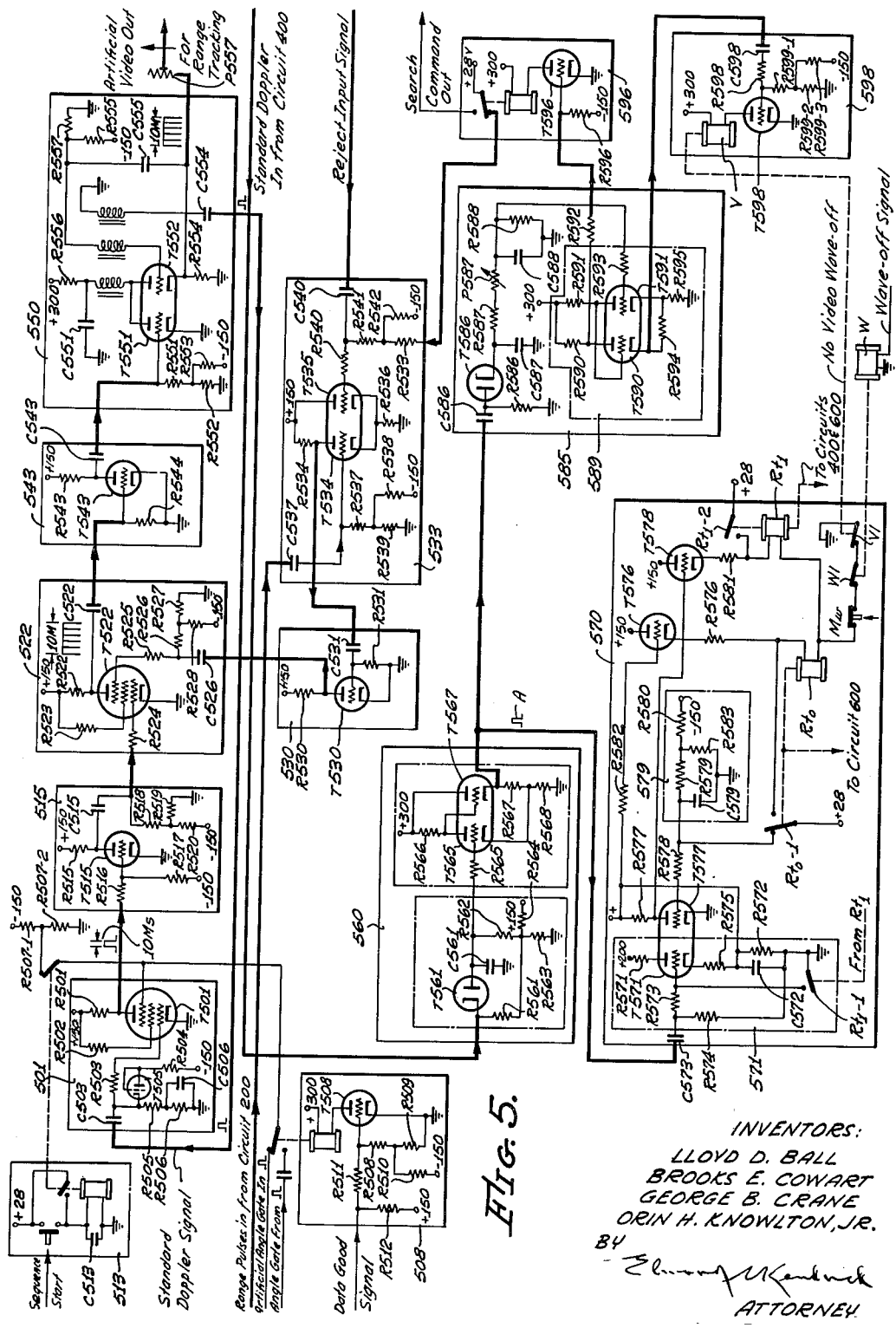
FIG. 5 is a schematic diagram of a suitable form of the sequencing control circuit of FIG. 1.
Figure 6:
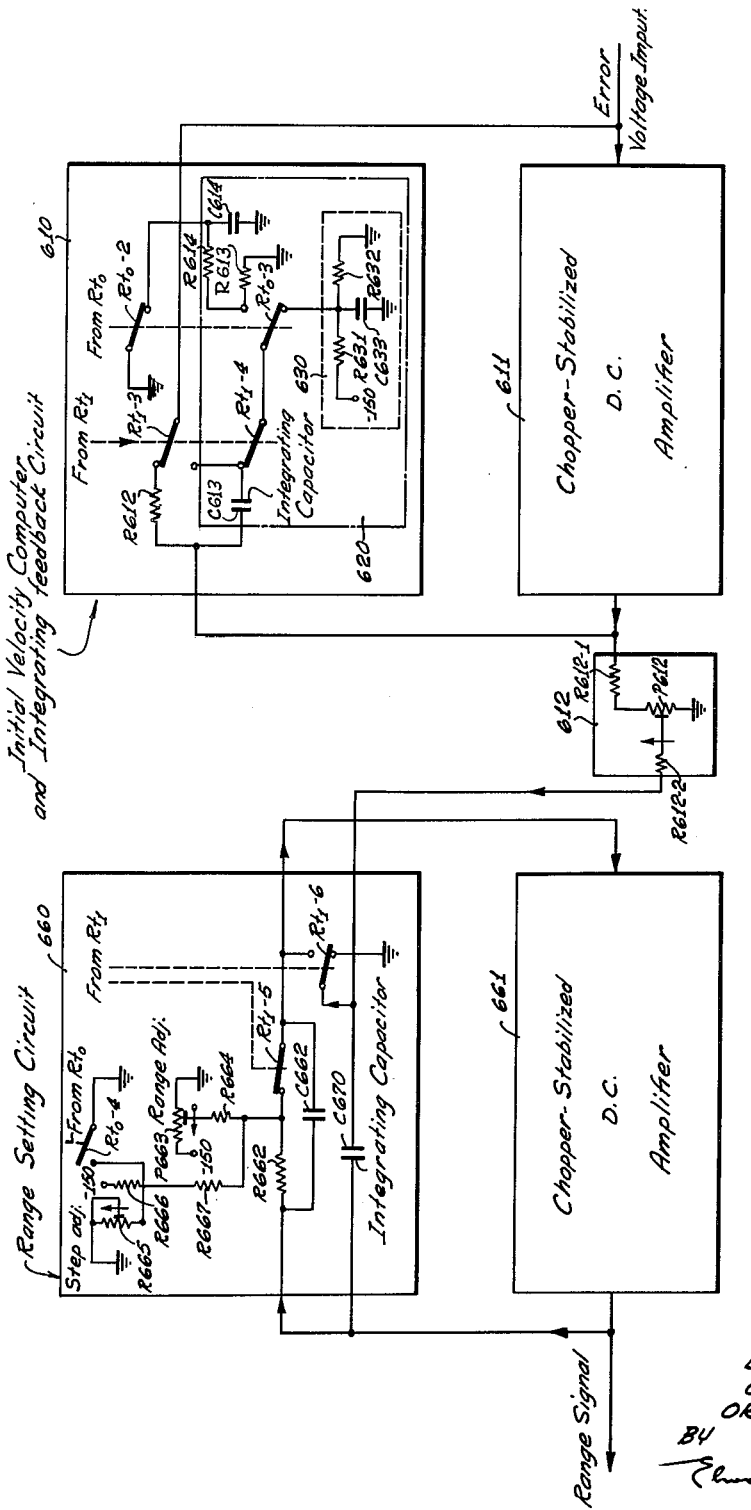
FIG. 6 is a schematic diagram illustrating a suitable form for the range signal generator of FIG. 1 including the initial velocity computer, the error signal integrator, and the velocity integrator.

The standard Doppler signals produced by circuit 400, described above, are applied to sequencing control circuit 500 which also receives angle gating signals produced by circuit 700 as well as certain other information-bearing signals which are introduced below. A suitable circuit arrangement for effecting the operation required in sequencing control, according to the invention, is shown in FIG. 5.

Before considering specific circuit connections, the general block diagram form of circuit 500 will be described. Referring now to FIG. 5 it will be noted that the standard Doppler signal received from circuit 400 is applied to an electronic gating stage 501. Stage 501 is operative to pass the applied Doppler signals when two gating conditions are satisfied. The first condition is the receipt of an angle gate signal which may be either an artificial gate or an angle gate from a selected channel. The other gating condition is the receipt of a sequence-start signal indicating that a sequencing operation is to commence.

The switching function to transfer from artificial gate input signals to angle gate signals from a selected channel is performed in a data-good switching circuit 508. Circuit 508 receives an input signal indicating that echoes received represent a good target. These signals may be provided in the manner described in the above-mentioned copending application by Van Alstyne.

Sequence start signals are provided by a start switching circuit 513 which receives a start signal and provides a corresponding output switching signal. The sequence start and angle gating signals are utilized to control the gating bias level of a pentode T501 in circuit 501. It is only when the sequence start signal has been received, removing one negative bias signal from pentode T501, and when a positive angle gating signal is received, that pentode T501 is operative to pass applied standard Doppler signals. It will be understood, of course, that other gating arrangements are possible. Moreover, it will be understood, that relay switching controls are not required since the same operation may be effected electronically.

Standard Doppler signals gated in this manner are then applied through an amplifier stage 515 to a second electronic gating stage 522. Gating stage 522 is controlled by applied standard Doppler signals gated in the above described manner to pass range pulses received through an amplifier stage 530 from an inhibiting gating stage 533. Gating stage 533 is normally operative to pass range pulses received from time modulator circuit 200 described above but is inhibited from so operating upon receipt of reject input signals indicating that the target of the particular range is being tracked in another system.

In terms of specific circuits shown, gating stage 533 comprises a differential amplifier where vacuum tube amplifier section T534 normally operates to amplify applied range pulses but is cut off and inhibited from operation when vacuum tube amplifier T535 receives the reject input signals.

Since several gating conditions have been satisfied, the range pulse signals produced by circuit 522 indicate that a searching sequence has been begun, that a target has been detected in the proper angle location, and that the target has not been rejected because it is being tracked in another system.

These range pulses then are applied to an amplifier stage 543 and thence to a blocking oscillator 550 which effectively is a power amplifier providing artificial video output signals which may be utilized in a range or angle computing system for tracking purposes such as automatic ground controlled approach.

Blocking oscillator 550 also provides negative range pulses gated in the above described manner which are then applied to acquisition-signal forming circuit 560. Essentially circuit 560 may be considered to be operative to reform gated range pulse signals into an envelope similar to the standard Doppler signal initially applied. After reformation, however, the signal is referred to as an acquisition signal rather than a standard Doppler signal since it contains other information as a result of the fulfillment of the gating conditions described above.

Signals A produced by acquisition-signal-forming circuit 560 are applied to a sequence switching circuit 570. Circuit 570 is noted to include two relays $Rt_0$ and $Rt_1$ which are operative at times $t_0$ and $t_1$, in a manner to be described, in response to acquisition signals A1 and A2, respectively. Thus relay $Rt_0$ provides the switching function required for actuating initial range setting circuit 660 to step to a signal level representing the second range mark and for actuating initial velocity computer 610 to begin generating the signal $v$. And relay $Rt_1$ is responsive to acquisition signal A2, as the target passes range mark #2, and is utilized to actuate initial velocity computer 610 to terminate the initial velocity computation and to transfer the initial velocity signal resulting to error signal integrator 640. In addition, relay $Rt_1$ includes switching contacts which are utilized in circuit 400 to suppress error signals prior to receipt of acquisition signal A2, as has been previously pointed out.

Acquisition signals A are also applied to an acquisition counter and trigger stage 585. Stage 585 is operative to count a predetermined number of acquisition signals and to produce a first output signal having a low level before reaching the number and a high level after reaching the number. This first output signal is utilized to control the operation of a search command output circuit 596 after the predetermined number of acquisition signals has been detected by circuit 585 and a corresponding high-level first output signal is produced. Circuit 596 produces a signal indicating that a good target is being tracked, insuring the proper utilization of the artificial video signals produced by circuit 500.

Stage 585 is also operative to indicate the cessation of acquisition signals for a predetermined time interval, and produces a second output signal having a high level indicating the end of this period. This signal is utilized to actuate a no-video waveoff switching circuit 598 which releases relays $Rt_0$ and $Rt_1$ in circuit 570.

These relays may also be reset or released by actuation of a manual waveoff switch $Mw$ or upon receipt of a waveoff signal which actuates relay W to transfer normally closed contact W1. These waveoff signals may have several possible meanings. They may indicate, for example, that the tracking sequence has been completed and therefore the sequencing circuit is to be reset for a subsequent sequencing operation. On the other hand, the waveoff signals may indicate that the target approach is improper and that the target must be waved off for another approach. Furthermore, the no-video waveoff signal may indicate that the tracking circuits have lost the target.

The number of acquisition signals which are counted by circuit 585 before triggering is determined on the basis of an expected number of acquisition signals before proper tracking begins. The length of the time interval without acquisition signals which is selected to indicate the termination of a tracking sequence must be long enough to prevent no-video waveoff where only a few acquisition signals are lost.

Since all of the circuit arrangements in sequencing circuit 500 are conventional except circuits 570 and 585, only these circuits will be described in particular detail. Referring now to circuit 570, it is noted that acquisition signals A are applied to the grid of an amplifier stage 571. Stage 571 includes a capacitor C572 and resistor R572 connected in parallel in the cathode circuit of tube T571 providing a storage circuit for received acquisition signals. Any signal received then is effectively regenerated for a time interval having a duration sufficient to actuate relay $Rt_0$ through a relay amplifier stage T576. In this manner relay $Rt_0$ is actuated upon receipt of acquisition signal A1.

Actuation of relay $Rt_0$ transfers contact $Rt_0$–1 removing 28 volt potential from the grid of an amplifier stage T577, the 28 volt potential being transferred to provide holding current for relay $Rt_0$. In this manner relay $Rt_0$ is actuated and held until subsequent release, and amplifier stage T577 is changed from a normally highly conducting condition with low impedance to a low conducting condition with high impedance.

The second acquisition signal A2 when received is then effective to pass through resistor R577 connected to the anode of tube T577 and actuates an amplifier stage T578 providing current for relay $Rt_1$. A signal could not previously have passed to stage T578 because tube T577 effectively provided a short to ground.

The actuation of relay $Rt_1$ transfers contact $Rt_1$–1 in amplifier circuit 571 and shorts the grid of tube T571 to ground preventing the receipt of further acquisition signals. Furthermore, contact $Rt_1$–2 is transferred providing holding current for relay $Rt_1$ so that once actuated it remains closed until subsequent release.

It will be noted that the grid of tube T577 is also connected to a voltage-retaining circuit 579. This circuit is operative to retain the 28 volts previously provided through contact $Rt_0$–1 for a predetermined time interval to prevent actuation of a tube T578 through resistor R577. This time interval is selected on the basis of information indicating the minimum time interval between acquisition signals A1 and A2. Thus circuit 579 effectively prevents the occurrence of two acquisition signals A1 and A2 within a time proximity of each other which is impossible on the basis of expected target velocity and the range difference established between the first and second range marks.

It will be noted again that relays $Rt_0$ and $Rt_1$ may be released or rest upon transfer of any of the contacts $Mw$, W1, or V1 corresponding respectively to: manual waveoff; input signal waveoff; and no-video waveoff, as has been explained above.

Counting and trigger stage 585, it will be noted, includes an energy storage counting circuit comprising a diode T586 and two capacitors C587 and C588. Capacitors C587 and C588 are selected to provide the desired step counting voltage in a manner now well known in the electronic art. The output signal derived in this manner across capacitor C588 is applied to the input circuit of a direct current trigger stage 589 including first and second vacuum tubes T590 and T591. Trigger stage 589 is biased so that it does not change stages until a predetermined number of acquisition signals have been received by energy storage counting capacitor 588 and thus provides an output signal indicating this occurrence, the signal being derived from tube T590. Capacitor C588 is provided with a discharge resistor R588, the time constant being adjusted in accordance with the time interval selected to indicate the termination of tracking. This time constant is also determined on the basis of the return hysteresis characteristics of trigger stage 589.

In considering the operation of circuit 585 as a whole, then, it is noted that a number of acquisition signals are counted before trigger stage 589 is actuated to produce a first output signal through tube T590 which is then utilized to control search-command switching stage 596. The discharge time constant of capacitor 588 as well as the return state biasing signal required for trigger stage 589 are then selected so that stage 589 returns to its original stage after an interval indicating the absence of acquisition signals for a predetermined period. This signal may be derived from the cathode of tube T590 and is then utilized to control no-video waveoff switching stage 598 providing a relay switching operation when a condition of video waveoff has been detected.

*Range Signal Generator Circuit Including Initial Velocity Computer, Initial Range Setting Circuit, Error Signal Integrator and Velocity Integrator*

(AS SHOWN IN FIG. 6)

The switching signals provided by relays $Rt_0$ and $Rt_1$ are utilized to control the operation of initial velocity computing and initial range setting circuits 610 and 660. It may be noted that the term signal as utilized herein may specify either a relay switching operation or an electrical signal since it is conceivable that the switch function provided by circuit 500 may be effected without relay circuits through the utilization of electronic switching signals. Therefore, the term signal is intended to include a mechanical function as well as an electrical function.

Referring specifically to the initial velocity computer 610, it will be noted that prior to actuation of relay $Rt_1$ contact $Rt_1$–3 remains unactuated and completes a resistance feedback path for a chopper stabilized D.C. amplifier stage 611 through a resistor R612. Suitable types of chopper stabilized D.C. amplifiers are well-known in the art, typical circuits being shown and described, for example, on pages 200 through 210 of a book entitled "Electric Analog Computers," published in 1952 by Korn and Korn, New York and London.

It will also be noted that circuit 610 includes an integrating capacitor C613 which forms part of an integrating feedback loop after relay $Rt_1$ is actuated. Integrating capacitor C613 also forms part of a hyperbolic function generating circuit 620 which is inoperative prior to the actuation of relay $Rt_0$. The circuit connections of the hyperbolic function generating circuit 620 can best be understood by considering relay $Rt_0$ as being actuated and all corresponding relay contacts as being transferred.

Thus it will be noted that capacitor C613 is connected to one end of a resistor R613 having its other end connected to ground. This connection forms a first RC exponential circuit. An output signal is derived from the junction of capacitor C613 and resistor R613 and is applied to a second RC exponential circuit comprising a resistor R614 and a capacitor C614. The two exponential charging circuits are designed according to the principles introduced in copending application Serial No. 494,178 by Brooks Ehrmon Cowart et al. for "Function Generating Circuits Requiring Only Linear Elements," filed March 14, 1955, now U.S. Patent Number 2,971,698.

Prior to the actuation of relay $Rt_0$, capacitor C614 is discharged through normally closed relay contact $Rt_0$–2 to ground, and capacitor C613 is charged to a predetermined initial condition through an initial charging circuit 630 connected to capacitor C613 through normally closed relay contacts $Rt_0$–3 and $Rt_1$–4. Essentially, charging circuit 630 is a predetermined potential supply and is shown as including a voltage divider comprising resistors R631 and R632 and a bypass capacitor C633 connecting the junction thereof to ground.

In operation then, circuit 610 essentially provides a resistive feedback circuit for amplifier 611 which results in a predetermined potential being applied to one terminal of capacitor C613. The potential applied to the other terminal of capacitor C613 is provided by initial charging circuit 630 in the manner described above. The status of circuit 610 at this point corresponds to a pre-acquisition condition. As soon as the first acquisition signal A1 is received and relay $Rt_0$ is actuated, hyperbolic function generating circuit 620 goes into operation and generates the velocity signal $v$ as the ratio of distance over time. This signal is generated as a varying charge across capacitor C613 so that at the end of the acquisition period, capacitor C613 is effectively transferred to the feedback circuit of D.C. amplifier 611 as relay contact $Rt_1$–3 is transferred, and the final charge on capacitor C613 corresponds to the computed initial velocity formulated as an average velocity equal to $\Delta d/\Delta t$, where $\Delta d$ is the range difference between the first and second range marks and $\Delta t$ is equal to $t_1-t_0$.

The switching signals provided by relays $Rt_0$ and $Rt_1$ are also utilized to control range setting circuit 660. Initially circuit 660 provides a range signal for chopper-stabilized D.C. amplifier stage 661 corresponding to the first range mark. During this time circuit 660 also provides a resistance feedback for D.C. amplifier 661 through a resistor R662 connected in parallel to a transient bypass capacitor C622. Thus initially D.C. amplifier 661 provides a constant amplification function generating the first range signal. The value of this first range signal may be adjusted through a range adjust potentiometer P663 coupled to resistor R662 by a resistor R664.

A second range signal is provided by amplifier 661 after relay $Rt_0$ is actuated and contact $Rt_0$–4 is transferred introducing a range step signal. The range step signal may be varied by adjusting a variable resistor R665 forming a voltage divider with series-connected resistor R666; the junction of the two resistors provides a range step signal when relay contact $Rt_0$–4 is closed providing a ground connection, the signal being applied to the input circuit of amplifier 661 through an adding resistor R667 and normally closed contact $Rt_1$–5.

Thus when relay $Rt_0$ is actuated, the input signal magnitude for amplifier 661 is stepped, resulting in a corresponding range signal step, at the output circuit of the amplifier. This stepped range signal charges an integrating capacitor C670 to an initial value representing the second range mark through normally closed contact $Rt_1$–6. When relay $Rt_1$ is actuated, contact $Rt_1$–6 is transferred completing a feedback path for capacitor C670 to the input circuit of amplifier 661.

It will be noted that a variable voltage-divider circuit 612 is shown coupled to amplifier 611 and may be considered to form part of the output circuit thereof. Variable voltage divider circuit 612 allows a scale-factor to be introduced into the velocity signal applied to amplifier 661 through transferred contact $Rt_1$–6.

A more detailed description of range signal generator circuit 600 is found in copending U.S. patent application Serial No. 492,482 for "Variable Range Signal Generating Circuit With Means for Computing Initial Velocity," by Lloyd David Ball et al., filed March 7, 1955, now U.S. Patent Number 2,832,537. Suitable circuit elements for circuit 600 of the present system are described in this copending application and therefore will not be introduced herein.

*Angle Gate Generator*

(AS SHOWN IN FIG. 7)

As indicated above the angle gate generator may form part of the system of utilization and therefore is not necessarily part of the system of the present invention. However, an important modification must be made in this generator for the purposes of the present invention. The filter separation technique of the present invention introduces a delay into the feedback control signals so that an unmodified angle gating signal would not properly coincide with the delayed control signals.

This filter delay effect may be considered as introducing a hysteresis error as is more fully explained in copending U.S. patent application Serial No. 491,062 for "Circuit for Eliminating the Hysteresis Effect Resulting From Time Delays Inherent in Track-While-Scan Systems," by Orin Henry Knowlton, Jr., et al., filed February 28, 1955, now U.S. Patent Number 2,845,532.

The angle gate generator of FIG. 7 thus includes a hysteresis eliminating circuit 710 which is assumed to be of the type described in the above-mentioned application by Knowlton et al., suitable circuit values for this arrangement being given in the copending application.

Hysteresis eliminating circuit 710 provides a modified scanning signal E which may be compared with an elevation or azimuth fixed-position signal in a circuit 720 to produce a gate signal G, which properly coincides in time with the delayed control or feedback signals. The operation of circuit 720 is described in the above-mentioned copending application by Van Alstyne, where it is referred to as an angle gate generator.

In brief, hysteresis eliminating circuit modifies a varying scanning signal B, such as is produced in the Van Alstyne system, to provide the modified scanning signal E by combining signal B with a positive and negative correction signal D produced by an S signal generator 711, in an adder circuit 715. The signal D has an amplitude corresponding to the correction required to compensate for time delays during the increasing and decreasing portions of the scanning signal B.

Signal generator 711 is actuated through a relay switch circuit 712 at the rate of change from increasing to decreasing signal portions of signal B. In the present application this is at one-half the rate of the switching signal A, controlling the change from azimuth to elevation signal generating, as in the Van Alstyne application. This frequency division is effected through a shaper circuit 713 which drives a flip-flop 714 producing signals at one-half frequency. Flip-flop 714 then provides a signal C which drives relay switch circuit 712 at the desired switching frequency.

A more detailed explanation of the operation of circuit 710 may be found in the above-mentioned copending application by Knowlton et al. Since gate circuit 720 operates in precisely the same manner as it does in the system of Van Alstyne, further detailed description is not deemed necessary.

*Specific Circuit Elements*

TIME-MODULATOR 200

Amplifier stage 210:
    Tube T210 _____ ½ of tube type 12AT7.
    Resistor R210 ____ 100K ohms.
Multivibrator 220:
    Tube T221a ⎫
    Tube T221b ⎭ ---- ½ sections of tube type 12AU7.
    Resistor R221 ____ 2.2K ohms.
    Resistor R222 ____ 11K ohms.
    Tube T223 _____ ½ section tube type 12AT7.
    Resistor R223 ____ 100K ohms.
    Resistor R224 ____ 2.2 megohms.
    Capacitor C224 ___ 220 micromicrofarads.
Input circuit 230:
    Potentiometer
      P231 _____ 5K ohms.
    Potentiometer
      P232 _____ 100K ohms.
    Resistor R233 ____ 1 megohm.
    Resistor R234 ____ 100K ohms.
    Capacitor C234 ___ .1 microfarad.
    Resistor R235 ____ 2 megohms.

EARLY-LATE SIGNAL GENERATOR 240

Blocking oscillator 241:
    Tubes 241a and
      241b _____ ½ sections of type 12AT7.
    Resistor R242 ____ 15K ohms.
    Capacitor C242 ___ .01 microfarad.
    Resistor R243 ____ 1 megohm.
    Capacitor C243 ___ .01 microfarad.
    Resistor R244 ____ 47K ohms.
    Capacitor C244 ___ 22 micromicrofarads.
    Resistor R245 ____ 4.7K ohms.
    Capacitor C245 ___ .01 microfarad.
    Resistor R246 ____ 22K ohms.
    Capacitor C246 ___ 2200 micromicrofarads.
    Resistor R247 ____ 150K ohms.
    Resistor R248 ____ 220 ohms.
Thyratron circuit 250:
    Tube T250 _____ Type 2D21.
    Resistor R252 ____ 1K ohm.
    Resistor R253 ____ 470K ohms.
    Resistor R255 ____ 22K ohms.
    Capacitor C255 ___ 100 micromicrofarads.
    Resistor R256 ____ 100K ohms.
    Resistor R257 ____ 22K ohms.
    Resistor R258 ____ 150K ohms.
Amplifier stages 261 and 262:
    Tube 261 ⎫
    Tube 262 ⎭ _____ ½ sections of tube type 12AU7.
    Resistor R261 ____ 2.2K ohms.
    Capacitor C261 ___ .1 microfarad.

DOPPLER FREQUENCY DETECTOR AND SMOOTHER STAGE 270

Associated with transformers 271:
    Resistor R271 ____ 4.7K ohms.
    Capacitor C271 ___ .1 microfarad.

Box-car detectors 280:
    Tube T280a ⎫
    Tube T280b ⎭ ---- ½ sections of tube type 12AT7.
    Capacitor C280 ___ .01 microfarad.
Integrating circuit 281:
    Resistor R281 ____ 1 megohm.
    Capacitor C281 ___ 100 micromicrofarads.
    Capacitor C282 ___ 22 micromicrofarads.
Smoothing stage 290:
    Tube T291 ⎫
    Tube T294 ⎬ _____ ½ sections of tube type 12AU7.
    Tube T298 ⎭
    Resistor R291 ____ 47K ohms.
    Capacitor C291 ___ .2 microfarad.
    Resistor R292 ____ 1 megohm.
    Resistor R293 ____ 4.7K ohms.
    Capacitor C293 ___ .01 microfarad.
    Resistor R294 ____ 33K ohms.
    Capacitor C294 ___ .2 microfarad.
    Resistor R295 ____ 2.2K ohms.
    Resistor R296 ____ 100K ohms.
    Resistor R297 ____ 47K ohms.
    Resistor R298 ____ 1 megohm.
    Resistor R299–1 __ 100 ohms.
    Capacitor C299 ___ .1 microfarad.
    Resistor R299–2 __ 15K ohms.

COMBINING CIRCUIT AND STANDARD DOPPLER SIGNAL GENERATOR 400

Resistor R411 ____ 1 megohm.
    Capacitor C411 ___ .2 microfarad.
    Resistor R412 ____ 3.3 megohms.
    Resistor R413 ____ 150K ohms.
    Resistor R414 ____ 3.3K ohms.
    Tube T411 ⎫
    Tube T416 ⎭ ----- ½ sections of tube type 12AU7.
    Resistor R415 ____ 34K ohms.
    Capacitor C415 ___ .1 microfarad.
    Resistor R416 ____ 4.7K ohms.
    Potentiometer
      P417 _____ 2.5 megohms.
Biasing circuit 418:
    Resistor R418–1 __ 1K ohms.
    Resistor R418–2 __ 4.7K ohms.
    Resistor R418–3 __ 150K ohms.
Error-Signal generating network 430:
    Tubes T431, T432,
      T433 and T434_ ½ sections of tube 6AL5.
    Resistors R431 and
      R432 _____ 1 megohm.
    Resistors R433 and
      R434 _____ 100K ohms.
    Capacitors C433
      and C434 _____ .2 microfarad.
    Resistors R435 and
      R436 _____ 4.7K ohms.
    Resistors R437 and
      R438 _____ 47K ohms.
    Resistor R440 ____ 470K ohms.

COMBINING CIRCUIT 450

Input circuits 451:
    Resistors R451 ___ 2.2 megohms.
    Capacitors C451 __ .2 microfarad.
    Tubes T451 _____ ½ sections of tube 6AL5.
    Tubes T453 and
      T454 _____ ½ sections of tube 12AU7.
    Resistors R453 and
      R454 _____ 100K ohms.
    Resistor R455 ____ 100K ohms.
Schmitt trigger circuit 470:
    Tube T471 _____ ½ section of tube 6AL5.
    Resistor R471 ____ 2.2 megohms.
    Potentiometer
      P472 _____ 100K ohms.
    Capacitor C471 ___ .2 microfarad.

Resistor R473____ 22K ohms.
Resistor R474____ 1 megohm.
Resistor R475____ 100K ohms.
Resistor R476____ 100K ohms.
Tubes T478 and
  T479 _____ ½ sections of tube 12AT7.
Resistor R477____ 3.3K ohms.
Resistor R478____ 1 megohm.
Resistor R479–1__ 100K ohms.
Resistor R479–2__ 3.3K ohms.
Capacitor C479___ .1 microfarad.

SEQUENCING CONTROL CIRCUIT 500

Electronic gating stage 501:
  Tube T501_____ ½ section of tube 6AS6.
  Resistor R501____ 150K ohms.
  Resistor R502____ 33K ohms.
  Resistor R503____ 1 megohm.
  Capacitor C503___ .2 microfarad.
  Resistor R504____ 150K ohms.
  Tube T505_____ ½ section of tube 12AU7.
  Resistor R505____ 1 megohm.
  Resistor R506____ 33K ohms.
  Capacitor C506___ .10 microfarad.
  Resistor R507–1__ 100K ohms.
  Resistor R507–2__ 47K ohms.
Data-Good switching circuit 508:
  Tube T508_____ ½ section of tube type 5814.
  Resistor R508____ 1 megohm.
  Resistor R509____ 68K ohms.
  Resistor R510____ 150K ohms.
  Resistor R511____ 1 megohm.
  Resistor R512____ 100K ohms.
Start switching circuit 513:
  Capacitor C513___ .042 microfarad.
Amplifier stage 515:
  Tube T515_____ ½ section of tube type 12AT7.
  Resistor R515____ 100K ohms.
  Capacitor C515___ .2 microfarad.
  Resistor R516____ 680K ohms.
  Resistor R517____ 1 megohm.
  Resistor R518____ 1 megohm.
  Resistor R519____ 22K ohms.
  Resistor R520____ 150K ohms.
Second electronic gating stage 522:
  Tube T522_____ ½ section of tube type 6AS6.
  Resistor R522____ 33K ohms.
  Capacitor C522___ 330 micromicrofarads.
  Resistor R523____ 33K ohms.
  Resistor R524____ 1 megohm.
  Resistor R525____ 22K ohms.
  Resistor R526____ 100K ohms.
  Capacitor C526___ 330 micromicrofarads.
  Resistor R527____ 22K ohms.
  Resistor R528____ 150K ohms.
Amplifier 530:
  Tube T530_____ ½ section of tube type 12AT7.
  Resistor R530____ 33K ohms.
  Resistor R531____ 100K ohms.
  Capacitor C531___ 330 micromicrofarads.
Inhibiting gate stage 533:
  Resistor R533____ 68K ohms.
  Resistor R534____ 15K ohms.
  Tube T534⎫
  Tube T535⎭ ------ ½ sections of tube type 5814.
  Resistor R536____ 3.3K ohms.
  Resistor R537____ 100K ohms.
  Capacitor C537___ 330 micromicrofarads.
  Resistor R538____ 150K ohms.
  Resistor R539____ 22K ohms.
  Resistor R540____ 22K ohms.
  Capacitor C540___ 330 micromicrofarads.
  Resistor R541____ 100K ohms.
  Resistor R542____ 150K ohms.
Amplifier 543:
  Tube T453_____ ½ section of tube type 12AT7.
  Resistor R543____ 33K ohms.
  Capacitor C543___ 330 micromicrofarads.
  Resistor R544____ 100K ohms.
Blocking oscillator 550:
  Tube T551⎫
  Tube T552⎭ ------ ½ sections of tube type 12AT7.
  Resistor R551____ 100K ohms.
  Capacitor C551___ .01 microfarad.
  Resistor R552____ 22K ohms.
  Resistor R553____ 150K ohms.
  Resistor R554____ 330 ohms.
  Capacitor C554___ .01 microfarad.
  Resistor C555____ 150K ohms.
  Capacitor C555___ 2200 micromicrofarads.
  Resistor R556____ 4.7K ohms.
  Resistor R557____ 22K ohms.
  Potentiometer
    P557 _____ 1K ohm.
Acquisition signal forming circuit 560:
  Tube T561_____ ½ section of tube type 6AL5.
  Resistor R561____ 100K ohms.
  Capacitor C561___ 1000 micromicrofarads.
  Resistor R562____ 1 megohm.
  Resistor R563____ 10K ohms.
  Resistor R564____ 150K ohms.
  Resistor R565____ 1 megohm.
  Tube T565⎫
  Tube T567⎭ ------ ½ sections of tube type 12AT7.
  Resistor R566____ 1 megohm.
  Resistor R567____ 100K ohms.
  Resistor R568____ 3.3K ohms.
Switching circuit 570:
  Tube T571⎫
  Tube T577⎭ ------ ½ sections of tube type 5814.
  Resistor R571____ 33K ohms.
  Resistor R572____ 220K ohms.
  Capacitor C572___ .22 microfarad.
  Resistor R573____ 1 megohm.
  Resistor R574____ 1 megohm.
  Resistor R575____ 47K ohms.
  Resistor R576____ 2.2K ohms.
  Resistor R577____ 150K ohms.
  Resistor R578____ 1 megohm.
  Tube T578_____ ½ section of tube type 5814.
  Capacitor C579___ 1 microfarad.
  Resistor R579____ 4.7 megohms.
  Resistor R580____ 150K ohms.
  Resistor R581____ 2.2K ohms.
  Resistor R582____ 100K ohms.
  Resistor R583____ 4.7K ohms.
Acquisition counter and trigger stage 585:
  Capacitor C586___ .01 microfarad.
  Resistor R586____ 100K ohms.
  Tube T586_____ ½ section of tube type 6AL5.
  Capacitor C587___ 1500 micromicrofarads.
  Resistor R587____ 4.7K ohms.
  Potentiometer
    P587 _____ 1 megohm.
  Capacitor C588___ 2 microfarads.
  Resistor R588____ 4.7 megohms.
  Tube T590⎫
  Tube T591⎭ ------ ½ sections of tube type 12AT7.
  Resistor R591____ 1 megohm.
  Resistor R592____ 1 megohm.
  Resistor R593____ 3.3 megohms.
  Resistor R594____ 47K ohms.
  Resistor R595____ 3.3K ohms.
Search command switching circuit 596:
  Tube T596_____ ½ section of tube type 12AU7.
  Resistor R596____ 680K ohms.
No-Video waveoff switching circuit 598:
  Tube T598_____ ½ section of tube type 5814.
  Resistor R598____ 220K ohms.
  Capacitor C598___ .1 microfarad.
  Resistor R599–1__ 1 megohm.
  Resistor R599–2__ 22K ohms.
  Resistor R599–3__ 150K ohms.

Summary

From the foregoing description it is apparent that the present invention provides a velocity tracking system wherein simulated range pulse signals are available which are highly accentuated over rain, noise, or other clutter, thereby allowing an increase in the range of acquisition.

The invention provides an important improvement in track-while-scan radar systems by further limiting the area of scanning in the domains of time and frequency. The improvement in the time domain is achieved through the technique of providing a variable range signal according to the integral of computed initial velocity. Improvement in the frequency domain is achieved through the technique of separating the expected Doppler frequency region for the velocity range of targets expected into a plurality of band pass divisions.

An effort has been made throughout to emphasize the basic system nature of the invention and to avoid unnecessary references to specific circuit components. However, it is not to be considered that any limitation is intended by the specific references which have been made, such references being incorporated to aid those skilled in the art in practicing the invention.

What is claimed is:

1. In a system for tracking moving targets where the rate of range variation of a target from a point of observation is indicated by the amplitude of received bipolar video signals resulting from the transmission of a scanning signal and reflection from the target, the combination comprising: a signal generator actuable to produce first and second range signals representing first and second ranges and a varying range signal as the integral of an applied input signal representing target velocity; first means responsive to said range signals and to said bipolar video signals for producing early and late feedback signals indicating that the range specified by said range signal is respectively greater than and less than the actual target range; second means responsive to said feedback signals for producing error signals indicating the sense of the difference between the actual target range and the target range specified by the corresponding range signal; means for combining said feedback signals to produce first and second acquisition signals indicating that a target is passing through the ranges specified by said first and second range signals, respectively; means responsive to said acquisition signals for producing an initial velocity signal indicating the target velocity between said first and second ranges; and means for integrating said error signal from an initial condition represented by said initial velocity signal to produce a velocity signal for actuating said range signal generator to produce said varying range signal.

2. The combination defined in claim 1 wherein said first means includes a pair of first circuits for detecting and smoothing the Doppler frequency component in the bipolar video signals, and a pair of second circuits coupled to said first circuits, respectively, each of said second circuits being a highly discriminative Doppler frequency filter and bias level detector.

3. The combination defined in claim 2 wherein each of said second circuits comprises a set of predetection filters for separating the Doppler frequency range into a corresponding set of frequency divisions, a corresponding set of detectors and filters for deriving the zero frequency component from said set of predetection filters, and a corresponding set of bias level gates having a common output circuit for producing an output signal indicating the presence of a Doppler signal having a level greater than a predetermined bias level, the bias level gates producing said early feedback signals providing output signals of a first polarity and the bias level gates producing said late feedback signals producing output signals of the opposite polarity.

4. In a system wherein Doppler frequency modulated, phase-detected target echoes indicate the presence of a moving target, the system including signal generating means responsive to timing signals indicating the transmission of radar signals and to applied range signals for producing time-modulated signals delayed with respect to said timing signals by time intervals corresponding to the applied range signals, respectively; a velocity tracking circuit comprising: first means actuable to produce first and second constant range signals and actuable to produce a variable range signal as a function of the integral of target velocity from an initial velocity condition, said range signals being suitable for controlling the signal generating means; second means responsive to said first and second constant range signals for producing corresponding first and second sequencing signals indicating the times that a target passes through the corresponding ranges; third means responsive to said first and second sequencing signals for computing the average velocity of the target during the corresponding range interval and producing an initial velocity signal; and fourth means responsive to said initial velocity signal and to applied signals representing any changes in target velocity following said second sequencing signal for producing the variable velocity signal representing the velocity of the target.

5. The velocity tracking circuit defined in claim 4 wherein said first means includes an initial range setting circuit and a velocity integrator, said initial-range setting circuit being operable to provide an initial-range signal corresponding to said first constant range signal and to step to said second constant range signal upon receipt of a first sequencing signal produced by said second means, said velocity integrator circuit being first operable to amplify said first and second constant range signals, without integration, and then operable in response to said second sequencing signal to integrate said variable velocity signal to produce said variable range signal.

6. The velocity tracking circuit defined in claim 4 wherein said second means includes an early-late signal generator responsive to said range signals for producing early and late gating signals surrounding said time-modulated signals by a predetermined range difference interval; early and late Doppler frequency detectors for respectively producing early and late Doppler signals indicating that target echoes occur earlier and later respectively, than corresponding time-modulated signals; and early and late circuits for Doppler frequency filtering and bias level detection of said Doppler signals to produce early and late control signals, respectively; and a combining circuit responsive to said early and late control signals for producing said first and second sequencing signals.

7. The velocity tracking circuit defined in claim 4 wherein said third means is operative to compute the velocity variable $v$ as the function $\Delta d/\Delta t$ where $\Delta d$ represents the range difference between the ranges represented by said first and second constant range signals and $\Delta t$ represents the time interval between said first and second sequencing signals; said third means including a rectangular hyperbolic function generator specified by the equation $v.t = d$, said third means being operative in response to said first sequencing signal to initiate the generation of said hyperbolic function at a point corresponding to $t=0$, and being operative in response to second sequencing signal to terminate the generation of said hyperbolic function at a time corresponding to the end of the time interval $\Delta t$, providing said initial velocity signal.

8. The velocity tracking circuit defined in claim 4 wherein said fourth means comprises an error signal integrator responsive to said initial velocity signal and to applied signals representing changes in target velocity for producing said variable velocity signal, said error integrator circuit including an integrating capacitor and a stabilized D.C. amplifier circuit, said initial velocity signal being utilized to charge said integrating capacitor to a corresponding initial condition upon receipt of said first sequencing signal, and said error integrator circuit being operable in response to said sequencing signal to integrate said velocity changes and produce an output signal representing the integrated sum of said initial velocity signal and said velocity changes.

9. A system for tracking moving targets where the rate of range variation of a target from a ground control station is indicated by the amplitude of received bipolar video signals resulting from the transmission of scanning signals and reflection from the target, said system comprising: pulse generating means responsive to trigger signals indicating the time of transmission of the scanning signals and responsive to applied range signals for producing time-delayed signals after the corresponding trigger signal, where the time therebetween represents the applied range signal; means responsive to each of said time-delayed signals for producing first and second time overlapping gating signals, the first gating signal occurring prior to said second gating signal by a time interval representing a predetermined range difference, the total time period covered by said gating signals corresponding to a predetermined range interval surrounding the range represented by the applied range signal; first and second Doppler frequency detectors and filters responsive to said first gating signal and second gating signals, respectively, and to bipolar video signals for producing first and second output signals, respectively, indicating that the bipolar video signals are occurring earlier and later, respectively, than said time-delayed signals; a combining and error signal generating circuit for producing standard signals indicating the appearance of a target within said predetermined range interval of each range specified by the applied range signals and for producing error signals indicating the sense and amount of the difference between said first and second output signals; and means responsive to said standard signals and said error signals for producing the applied range signals, said means including a first circuit actuable to produce a first range signal specifying a first range where the target is to be detected, said first circuit being actuable to step to a second range signal upon receipt of a standard signal indicating that the target has crossed said first range within said predetermined range interval, a second circuit responsive to first and second standard signals indicating that the target has passed through said first and second ranges, respectively, for producing an initial velocity signal indicating the average velocity of the target between said first and second ranges, a third circuit responsive to said error signal and to said initial velocity signal for producing a varying velocity component as a function of the interval of said error signal from an initial condition corresponding to said initial velocity signal, said first circuit being actuable after receipt of said second standard signal to integrate said varying velocity signal to produce a corresponding varying range signal for application to said pulse generator.

10. In a system for locating targets moving at a velocity measurable as the Doppler frequency component modulating the amplitude of received phase-detected target echoes, the system including means producing trigger signals at the time of transmission of each target scanning signal and range-pulse generating means responsive to the trigger signals and to applied range-indicating signals for producing range pulses delayed in time from corresponding trigger signals by amounts representing the range-indicating signals, respectively; a circuit for range tracking by velocity integration comprising: first and second means responsive to the range pulses and to said phase-detected target echoes for producing first and second output signals, respectively, said first and second output signals indicating that the corresponding target echoes occur earlier and later, respectively, than the corresponding range pulses within a predetermined time interval, and the concurrence of both of said output signals indicating the substantial coincidence in time between said range pulse and the corresponding target echo; third means for combining said output signals to produce a standard Doppler signal indicating that a moving target has been detected at substantially the range specified by the applied range-indicating signal, said third means also producing a third output signal having levels determined by the difference between said output signals and indicating the sense of the difference in time between said range pulse and the corresponding target echo; and fourth means responsive to said standard signal and to said third output signal for generating a range signal as a function of the integral of velocity, said range signal being utilized to control the range pulse generating means, said fourth means including a first circuit actuable to produce a first range signal, a second circuit responsive to the standard signal resulting from the control effected by said first range signal for producing a second range signal, a third circuit responsive to the standard signals resulting from the detection of a target in the range specified by said first and second range signals for producing an initial velocity signal indicating the average velocity of the target between said first and second range signals, and a fourth circuit for integrating said third output signals from said initial velocity signal to produce a varying velocity signal and for integrating said varying velocity signal to produce a varying range signal to control the generation of said range pulses.

11. In a system wherein phase-detected target echoes indicate the presence of a moving target, the system including signal generating means responsive to timing signals indicating the transmission of radar signals and to applied range signals for producing time-modulated signals delayed with respect to said timing signals by time intervals corresponding to the applied range signals, respectively; a velocity tracking circuit comprising: first means actuable to produce first and second range signals and to integrate an applied velocity-indicating signal to produce a corresponding varying range signal, the range signals being suitable for controlling the signal generating means; second means responsive to the time-modulated signals resulting from the control effected by said range signals and responsive to the phase-detected target echoes for producing late signals indicating that the corresponding target echoes occur later than the corresponding time-modulated signals and for producing early signals indicating that the corresponding target echoes occur earlier than the corresponding time-modulated signals; third means for combining said early and late signals to produce first and second composite signals indicating the times that a target passes through the ranges specified by said first and second range signals, respectively; fourth means for actuating said first means to step said first range signal to said second range signal upon receipt of said first composite signal; fifth means operable upon receipt of said first composite signal for computing the average velocity component of the target between corresponding ranges and producing an initial velocity signal corresponding thereto; sixth means coupled to said first means for receiving said initial velocity signal and forming the velocity indicating signal as a function of the integral of the difference between said early and late signals and said initial velocity signal, said velocity indicating signal being applied to said first means.

12. The combination comprising: a signal generator actuable to produce first and second range signals representing first and second ranges through which a target is expected to pass and a varying range signal as the integral of an applied input signal representing target velocity; error signal generating means responsive to said range signals for producing error signals indicating the sense of the difference between the actual target range and the target range specified by the corresponding range signal; acquisition signal generating means responsive to said first and second range signals for producing acquisition signals indicating that a target is passing through the ranges specified; and means for producing said input signal representing target velocity in response to said acquisition signals and said error signals by producing an initial velocity signal indicating the target velocity between said first and second ranges and integrating said error signals from said initial velocity condition to produce said input signal.

13. A velocity tracking circuit for a moving target comprising: first means actuable to produce first and second constant range signals and actuable to produce a variable range signal as a function of the integral of target velocity from an initial velocity condition; second means responsive to said first and second range signals for producing corresponding first and second sequencing signals indicating the times at which the target passes through the corresponding ranges; third means responsive to said first and second sequencing signals for computing the average velocity of the target during the corresponding range interval and producing an initial velocity signal representing the velocity of the target at the second range; and fourth means responsive to said initial velocity signal and to applied signals representing any changes in target velocity following said second sequencing signal for producing a variable velocity signal representing the velocity of the target after passing through the second range.

References Cited in the file of this patent

UNITED STATES PATENTS 2,688,743  Berger et al. _____ Sept. 7, 1954

UNITED STATES PATENT OFFICE
CERTIFICATE OF CORRECTION

Patent No. 3,056,128            September 25, 1962

Lloyd David Ball et al.

It is hereby certified that error appears in the above numbered patent requiring correction and that the said Letters Patent should read as corrected below.

Column 5, line 7, for "targe" read -- target --; column 8, line 44, after "to" insert -- operate in --; column 16, line 23, for "rest" read -- reset --; line 38, for "588" read -- C588 --; column 20, line 29, in the line before "Resistor R411" insert -- Amplifiers 410: --.

Signed and sealed this 19th day of February 1963.

(SEAL)
Attest:

ESTON G. JOHNSON
Attesting Officer

DAVID L. LADD
Commissioner of Patents